(12) United States Patent
Johnson et al.

(10) Patent No.: US 11,379,497 B2
(45) Date of Patent: Jul. 5, 2022

(54) DATA MODEL DATABASE

(71) Applicant: AT&T Intellectual Property I, L.P., Atlanta, GA (US)

(72) Inventors: Theodore Johnson, New York, NY (US); Vladislav Shkapenyuk, New York, NY (US); Divesh Srivastava, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1050 days.

(21) Appl. No.: 16/014,173

(22) Filed: Jun. 21, 2018

(65) Prior Publication Data

US 2019/0392070 A1 Dec. 26, 2019

(51) Int. Cl.
*G06F 16/25* (2019.01)
*G06F 16/28* (2019.01)
*G06F 16/242* (2019.01)
*G06F 16/2455* (2019.01)

(52) U.S. Cl.
CPC ........ *G06F 16/258* (2019.01); *G06F 16/2443* (2019.01); *G06F 16/24565* (2019.01); *G06F 16/288* (2019.01)

(58) Field of Classification Search
CPC .................................................. G06F 16/258
USPC ......................................................... 707/803
See application file for complete search history.

(56) References Cited

U.S. PATENT DOCUMENTS

| | | | |
|---|---|---|---|
| 6,704,747 B1* | 3/2004 | Fong | G06F 16/252 |
| 7,085,757 B2 | 8/2006 | Dettinger et al. | |
| 7,096,229 B2 | 8/2006 | Dettinger et al. | |
| 7,225,411 B1 | 5/2007 | Stoner et al. | |
| 7,526,471 B2 | 4/2009 | Dettinger et al. | |
| 7,599,924 B2 | 10/2009 | Dettinger et al. | |
| 8,027,971 B2 | 9/2011 | Dettinger et al. | |
| 8,078,643 B2 | 12/2011 | Mush et al. | |
| 9,128,912 B2 | 9/2015 | Kamiya | |
| 9,646,092 B2 | 5/2017 | Cooper et al. | |
| 2009/0182703 A1 | 7/2009 | Nachimuthu et al. | |
| 2011/0197197 A1* | 8/2011 | Ni | G06F 9/547 |
| | | | 718/104 |
| 2018/0075049 A1 | 3/2018 | Capillo Carril | |

* cited by examiner

*Primary Examiner* — Cam Linh T Nguyen
(74) *Attorney, Agent, or Firm* — Guntin & Gust, PLC; Jay Anderson

(57) ABSTRACT

Systems and methods utilize a data model database which includes a plurality of symbol data types. Each of the plurality of symbol data types have one or more symbol data fields. The data model database further includes a plurality of concrete data types. Each of the concrete data types have one or more language-agnostic concrete fields associated with each of the one or more symbol data fields. Each of the one or more language-agnostic concrete fields apply one or more concrete constraints to each of the corresponding symbol data fields. The data model database further includes a plurality of carrier data types. The plurality of carrier data types having one or more language-specific carrier fields associated with each of the one or more language-agnostic concrete fields. Each of the one or more language-specific carrier fields apply one or more carrier constraints to each of the corresponding language-agnostic concrete fields.

6 Claims, 9 Drawing Sheets

DATA MODEL DATABASE

TECHNICAL FIELD

The present disclosure relates generally to systems and methods for managing data types, and more particularly concerns a data model database for cross-comparison of different models, languages, and formats.

BACKGROUND

Large-scale software efforts often use structured data in a variety of formats, described using a variety of languages including, e.g., Yang, Tosca, Heat, JavaScript Object Notation (JSON), XSD, relational data definition language (DDL) definitions, and others. More, in such environments, Application Programming Interfaces (APIs) and data artifacts are often described according to various schemas (e.g., Swagger, a JSON Schema) and relational DDLs. Coordinating internal and external software development efforts to ensure interoperability requires that the APIs and data artifacts of the various efforts can be collected and communicated among the relevant parties. This is particularly relevant in modern virtualized networks and/or networks using software defined networking (SDN) where developers leverage model-driven networking across enterprises. For example, work done using the AT&T Enhanced Control, Orchestration, Management and Policy platform (ECOMP) and related Open Network Automation Platform (ONAP) frequently involves structured data in many formats and languages, despite the fact that any portion of information may have multiple uses or dependencies beyond its carrier configuration.

A common approach to setting standards for common data models and formats is to create a "data dictionary" which describes properties such as the meaning of attribute names (e.g. Timestamp always means a timestamp), and may hold a collection of files that describe standard data formats and models as record layouts or data layouts. Conventional data dictionaries suffer from a variety of limitations that severely limit their applicability in large-scale software efforts and shared development environments. Routine use of data dictionaries involves manual entry of information or import by filename, followed by cross-referencing between data dictionaries associated with disparate models. Versioning is extremely difficult to perform in real-time where multiple developers or entities are engaged in simultaneous efforts. Changes are difficult to propagate and even where a particular data dictionary is updated timely related fields in the same or different data dictionaries may not be updated. While some data dictionaries facilitate the use of anonymous types—data types which are not explicitly named—the reuse of common data types between models is laborious and potentially risky for developers.

SUMMARY

The needs existing in the field are addressed by the present disclosure, which relates to systems, methods and computer useable media for development and use of a data-model database facilitating cross-model, cross-language, and cross-format comparison and utilization of data types and related information.

In an embodiment, at least one non-transitory computer readable medium is configured to store a data model database comprising: a plurality of symbol data types, each of the plurality of symbol data types having one or more symbol data fields; a plurality of concrete data types, each of the concrete data types having one or more language-agnostic concrete fields associated with each of the one or more symbol data fields, each of the one or more language-agnostic concrete fields applying one or more concrete constraints to each of the corresponding symbol data fields; and a plurality of carrier data types, the plurality of carrier data types having one or more language-specific carrier fields associated with each of the one or more language-agnostic concrete fields, each of the one or more language-specific carrier fields applying one or more carrier constraints to each of the corresponding language-agnostic concrete fields.

In another embodiment, a method comprises identifying a carrier type based on language-specific carrier data from a first system; identifying, in a data model database, a language-agnostic concrete type associated with the language-specific carrier type; identifying a symbol data type associated with the language-agnostic concrete type; and converting the language-specific carrier data to a second language-specific carrier type based on the symbol data type.

In another embodiment, a method comprises receiving a request to delete a data type collection, wherein the data type collection is reflected in a data model database, and wherein the data type collection includes one or more data types, the one or more data types including at least one of a symbol data type, a language-agnostic concrete type, or a language-specific carrier data type; determining a dependency chain for the data type collection using the data model database; and indicating the data type collection as delete safe or not delete safe, wherein the data type collection is marked as delete safe if the dependency chain indicates that remaining data types in the data model database do not include references to the one or more data types of the data type collection, and wherein the data type collection is marked not delete safe if the dependency chain indicates that one or more of the remaining data types in the data model database include references to the one or more data types of the data type collection.

These summary aspects are intended for purposes of example only and should be construed as non-limiting as alternative and complementary aspects will be apparent based on the Detailed Description hereafter.

DETAILED DESCRIPTION OF ILLUSTRATIVE EMBODIMENTS

As described above, routine data dictionaries fail to establish authoritative control data types in software environments involving multiple entities. An unconventional data model database is disclosed to manage the complex data structures and interrelationships of models in such environments.

A simple example of composition challenges can be illustrated with a masked IPv4 address, which consists of two parts, the address and the mask. The IP address is four numbers separated by periods, and could be represented as, e.g., a string with a particular pattern, an integer, four integer fields, an array of four integers, et cetera. In this regard, composition can present challenges for consistent use of data. The mask could be an integer with a given range, imposing constraints and defining the mask by inheritance. A timestamp associated with the IPv4 address could have any number of string, integer, floating point, or other representations. The disclosed data model database not only controls these various representations within a particular format or model, but allows for cross-comparison and reuse of the data in a variety of models.

Figure 1:
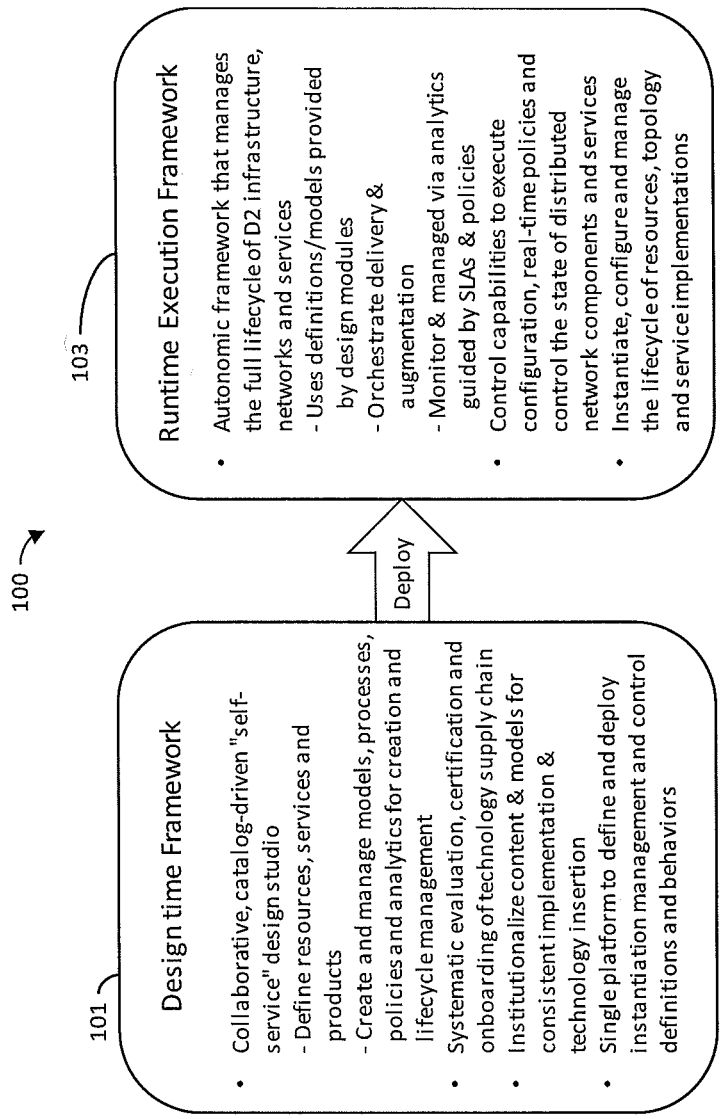
FIG. 1 is a block diagram illustrating the architecture of an enhanced control, orchestration, management and policy platform in which an embodiment of a control loop automation management platform may be implemented. The embodiment may be implemented in two types of architectures, namely centralized or distributed.

FIGS. 1-6 depict an example environment in which a data model database as disclosed herein can be leveraged. Illustrated in FIG. 1 is a schematic of the architecture of an enhanced control, orchestration, management and policy platform, (ECOMP platform 100) that is implemented in a cloud environment. The ECOMP platform 100 includes a design time framework component 101 and a runtime execution framework 103. The cloud environment provides a number of capabilities including real-time instantiation of virtual machines (VMs) on commercial hardware where appropriate; dynamic assignment of application and workloads to VMs; dynamic movement of applications and dependent functions to different VMs on servers within and across data centers in different geographies (within the limits of physical access tie-downs constraints); and dynamic control of resources made available to applications (CPU, memory, storage). With the use of network function virtualization, network appliances have been transformed into software applications. In the integrated cloud environment the dynamic cloud capabilities are applied to applications—i.e., virtual network functions (VNFs)-thus applying the benefits of the cloud environment to virtual network elements. For example, VNFs, such as routers, switches, firewalls, can be "spun up" on commodity hardware, moved from one data center to another center dynamically (within the limits of physical access tie-down constraints) and resources such as CPU, memory and storage can be dynamically controlled.

The ECOMP platform 100 enables the rapid on-boarding of new services and the reduction of operating expenses and capital expenses through its metadata-driven service design and creation platform and its real-time operational management framework—a framework that provides real-time, policy driven automation of management functions. The metadata-driven service design and creation capabilities enable services to be defined with minimal information technology development required thus contributing to reductions in capital expenses. Real-time operational management framework provide significant automation of network management functions enabling the detection and correction of problems in an automated fashion contributing to reductions in operating expenses.

The ECOMP platform 100 enables product/service independent capabilities for design, creation and lifecycle management. The design time framework component 101 is an integrated development environment with tools, techniques, and repositories for defining/describing network assets. The design time framework component 101 facilitates re-use models thus improving efficiency as more models are available for reuse. Assets include models of the cloud environment resources, services and products. The models include various process specifications and policies (e.g., rule sets) for controlling behavior and process execution. Process specifications are used by the ECOMP platform 100 to automatically sequence the instantiation, delivery and lifecycle management aspects of the integrated cloud environment based resources, services, products and the components of the ECOMP platform 100. The design time framework component 101 supports the development of new capabilities, augmentation of existing capabilities and operational improvements throughout the lifecycle of a service. Service design and creation (SDC), policy, and data collection, analytics and events (DCAE) software development kits (SDKs) allow operations/security, 3rd parties (e.g., vendors), and other experts to continually define/refine new collection, analytics, and policies (including recipes for corrective/remedial action) using a design framework portal. Certain process specifications (aka 'recipes') and policies are geographically distributed to many points of use to optimize performance and maximize autonomous behavior in integrated cloud environment's federated cloud environment.

The runtime execution framework 103 executes the rules and policies distributed by a design and creation environment. This allows for the distribution of policy enforcement and templates among various ECOMP modules (described below). These components advantageously use common services that support logging, access control, and data management.

Figure 2:
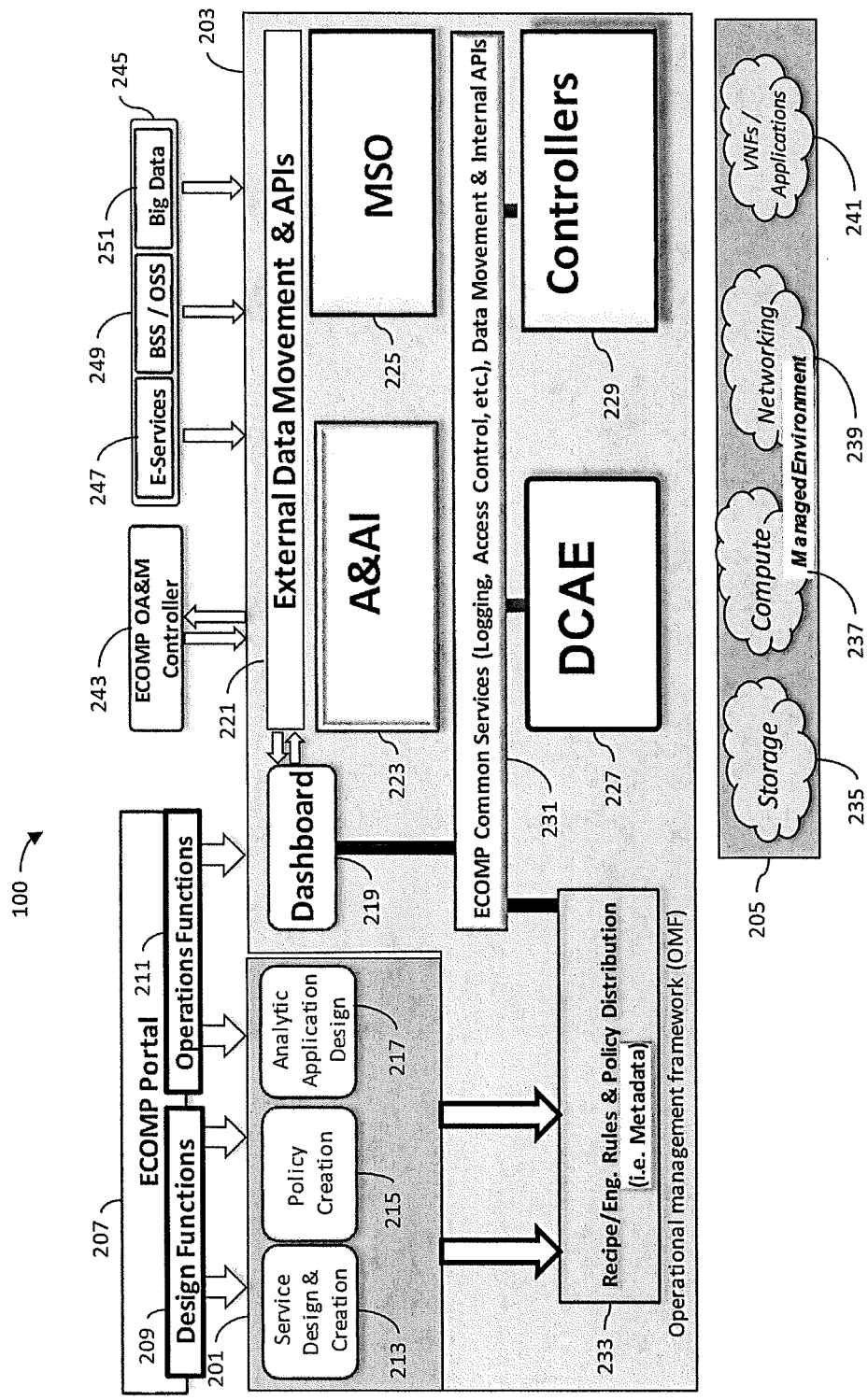
FIG. 2 is a block diagram of a platform for enhanced control, orchestration, management and policy in which embodiments of the control loop automation management platform may be implemented.

Illustrated in FIG. 2 are the components of an embodiment of the ECOMP platform 100. The ECOMP platform 100 is provided with three environments. These are the design creation environment 201, the execution environment 203, and the managed environment 205 shown as shaded areas in FIG. 2.

The ECOMP platform 100 includes an ECOMP Portal 207 that provides design functions 209 and operations functions 211. The design functions 209 include a service design and creation component 213 and policy creation component 215. The operations functions 211 include analytic application design component 217 and a dashboard 219. The service design and creation component 213, the policy creation component 215 and analytic application design component 217 are all part of the design creation environment 201. The dashboard is part of the execution environment 203.

In addition to the dashboard 219 the execution environment 203 includes: an external data movement and application program interface component, (API component 221); an active and available inventory module, (A&AI module 223); a master service orchestrator, (MSO 225); a data collection, analytics and events component, (DCAE module 227); controllers 229; a common services component 231; and a recipe/engineering rules and policy distribution component 233.

The managed environment 205 comprises resources, either hardware or software, that may be categorized as: infrastructure resources—(the Cloud resources, e.g., Storage 235, Compute 237); networking resources 239 (network connectivity functions & elements); and VNF/application resources 241 (the features and capabilities of a software application).

Interacting with the execution environment may be an operations, administration and management controller, (OA&M Controller 243); and a number of external applications 245 that may include e-services 247, business support system and operational support systems, (BSS/OSS application 249), and big data services 251 among others.

Figure 3:
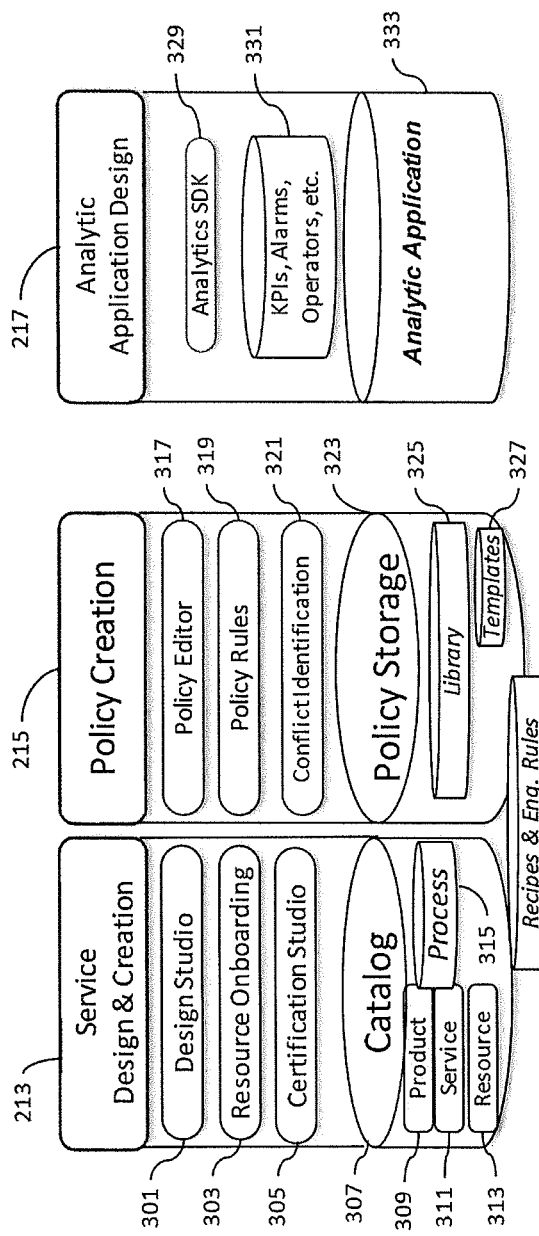
FIG. 3 is a block diagram of the service design and creation component, the policy creation component and the analytic application design component of the platform for enhanced control, orchestration, management and policy.

Illustrated in FIG. 3 are the subcomponents of the service design and creation component 213. The service design and creation component 213 is an integrated development environment with tools, techniques and repositories to define/simulate/certify cloud environment assets as well as their associated processes and policies. The service design and creation component 213 may include a design studio subcomponent 301; a resource onboarding subcomponent 303; a certification studio subcomponent 305; a catalog subcomponent 307. Catalog subcomponent 307 may include information about groups such as products 309, services 311, resources 313 and processes 315.

The policy creation component 215 deals with policies, which are conditions and requirements, constraints, attributes, or needs that must be provided, maintained, and/or enforced. At a lower level the policy creation component 215 involves machine-readable rules enabling actions to be taken based on triggers or requests. Policies often consider specific conditions in effect (both in terms of triggering specific policies when conditions are met, and in selecting specific outcomes of the evaluated policies appropriate to the conditions). Policies allow rapid updates through easily updating rules, thus updating technical behavior of components in which those policies are used, without requiring rewrites of their software code. Policies permit simpler management/control of complex mechanisms via abstraction. The policy creation component 215 may include a policy editor 317; policy rules subcomponent 319; conflict identification subcomponent 321; policy storage subcomponent 323. The policy storage subcomponent 323 may include a library 325 and templates 327.

The policy creation component 215 has a broad scope supporting infrastructure, product/services, operation automation, and security-related policy rules. These policy rules are defined by multiple stakeholders, (Network/Service Designers, Operations, Security, customers, etc.). In addition, input from various sources (service design and creation component 213, policy editor 317, customer input, etc.) are collected and rationalized. Therefore, a centralized policy creation environment will be used to validate policies rules, identify and resolve overlaps and conflicts, and derive policies where needed. The policy creation component 215 is accessible, developed and managed as a common asset, and provides editing tools to allow users to easily create or change policy rules. Offline analysis of performance/fault/closed-loop action data are used to identify opportunities to discover new signatures and refine existing signatures and closed loop operations. Policy translation/derivation functionality is also included to derive lower level policies from higher level policies. Conflict detection and mitigation are used to detect and resolve policies that may potentially cause conflicts, prior to distribution. Once validated and free of conflicts, policies are placed in an appropriate repository.

After completing initial policy creation or modification to existing policies, the policy distribution component 233 sends policies (e.g., from the repository) to their points of use, in advance of when they are needed. This distribution is intelligent and precise, such that each distributed policy-enabled function automatically receives only the specific policies which match its needs and scope.

Notifications or events can be used to communicate links/URLs for policies to components needing policies, so that components can utilize those links to fetch particular policies or groups of policies as needed. Components in some cases may also publish events indicating they need new policies, eliciting a response with updated links/URLs. Also, in some cases policies can be given to components indicating they should subscribe to one or more policies, so that they receive updates to those policies automatically as they become available.

The analytic application design component 217 includes an analytics software development kit (SDK 329), and storage 331 for key performance indicators (KPIs), alarms, operators, etc., as well as storage for analytic application 333.

Figure 4:
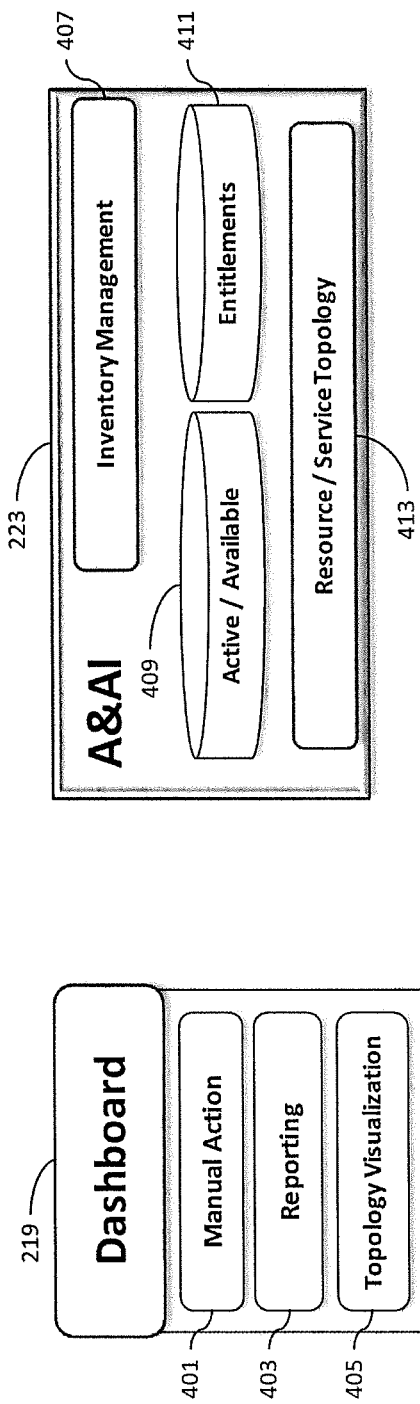
FIG. 4 is a block diagram of the dashboard and active and available inventory module of the platform for enhanced control, orchestration, management and policy.

As shown in FIG. 4, the dashboard 219 includes a manual action subcomponent 401, a reporting subcomponent 403 and a topology visualization subcomponent 405. The dashboard 219 provides access to design, analytics and operational control/administration functions.

The A&AI module 223 is the component that provides real-time views of the resources, services, products and their relationships. The views provided by the A&AI module 223 relate data managed by multiple ECOMP platforms 100, business support systems and operation support systems, (BSS/OSS application 249), and network applications to form a "top to bottom" view ranging from the products customers buy to the resources that form the raw material for creating the products. A&AI module 223 not only forms a registry of products, services, and resources, it also maintains up-to-date views of the relationships between these inventory items. Active and available inventory submodule 409 will manage these multi-dimensional relationships in real-time. The A&AI module 223 is provided with an inventory management submodule 407, an entitlements submodule 411 and a resource/service topology submodule 413.

The inventory management submodule 407 maintains real-time inventory and topology data by being continually updated as changes are made within the integrated cloud. It uses graph data technology to store relationships between inventory items. Graph traversals can then be used to identify chains of dependencies between items. Data views of the A&AI module 223 are used by homing logic during real-time service delivery, root cause analysis of problems, impact analysis, capacity management, software license management and many other integrated cloud environment functions.

The inventory and topology data includes resources, service, products, and customer subscriptions, along with topological relationships between them. Relationships captured by A&AI module 223 include "top to bottom" relationships such as those defined in the service design and creation component 213 and when products are composed of services, and services are composed of resources. It also includes "side to side" relationships such as end to end connectivity of virtualized functions to form service chains. A&AI module 223 also keeps track of the span of control of each controller, and is queried by MSO 225 and placement functions to identify which controller to invoke to perform a given operation.

A&AI module 223 is metadata driven, allowing new inventory item types to be added dynamically and quickly via catalog definitions, reducing the need for lengthy development cycles. A&AI module 223 provides the following key requirements:

Provide accurate and timely views of resource, service, and product inventory and their relationship to the customer's subscription;
Deliver topologies and graphs;
Maintain relationships to other key entities (e.g., location) as well as non-integrated cloud environment inventory;
Maintain the state of active, available and assigned inventory within the ECOMP platform 100;
Allow introduction of new types of Resources, Services, and Products without a software development cycle (i.e., be metadata driven);
Be easily accessible and consumable by internal and external clients;
Provide functional APIs that expose invariant services and models to clients;
Provide highly available and reliable functions and APIs capable of operating as generic cloud workloads that can be placed arbitrarily within the cloud infrastructure capable of supporting those workloads;
Scale incrementally as volumes in the ECOMP platform 100 and cloud infrastructure scales;
Perform to the requirements of clients, with quick response times and high throughput;
Enable vendor product and technology swap-outs over time, e.g., migration to a new technology for data storage or migration to a new vendor for MSO 225 or Controllers 229;
Enable dynamic placement functions to determine which workloads are assigned to specific components of the ECOMP platform 100 (i.e., Controllers 229 or VNFs) for optimal performance and utilization efficiency; and
Identify the controllers 229 to be used for any particular request.

A&AI module 223 also performs a number of administrative functions. Given the model driven basis of the ECOMP platform 100, metadata models for the various catalog items are stored, updated, applied and versioned dynamically as needed without taking the system down for maintenance. Given the distributed nature of the A&AI module 223 as well as the relationships, with other components of the ECOMP platform 100, audits are periodically run to assure that the A&AI module 223 is in sync with the inventory masters such as controllers 229 and MSO 225. Adapters allow the A&AI module 223 to interoperate with non-integrated cloud environment systems as well as 3rd party cloud providers via evolving cloud standards.

Consistent with other applications of the ECOMP platform 100, the A&AI module 223 produces canned and ad-hoc reports, integrates with the dashboard 219, publishes notifications other components of the ECOMP platform 100 can subscribe to, and performs logging consistent with configurable framework constraints.

Figure 5:
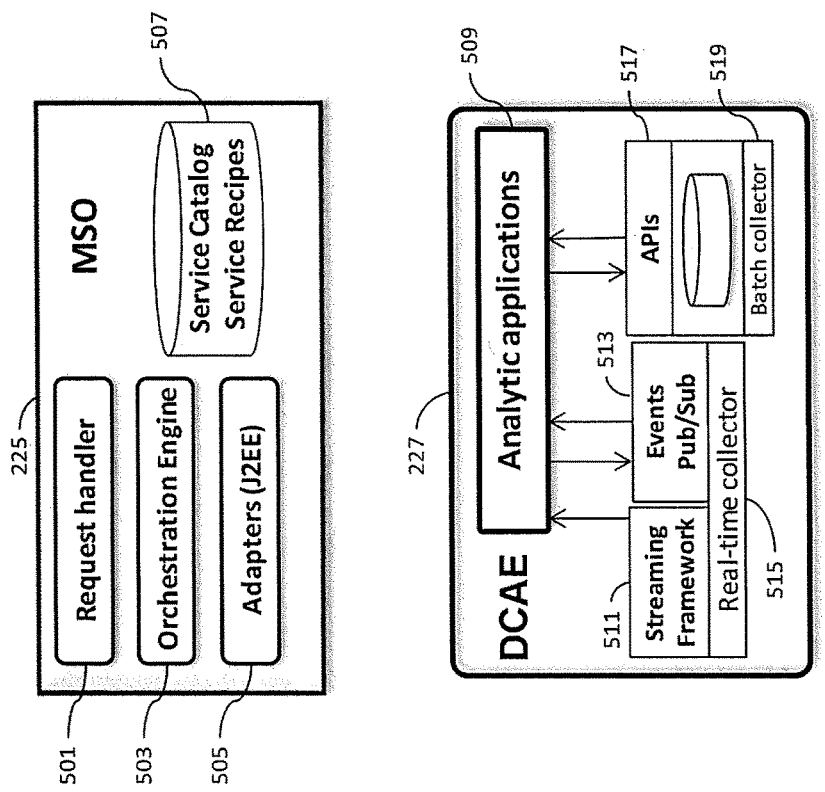
FIG. 5 is a block diagram of the master service orchestrator component and the data collection, analytics and events component of the platform for enhanced control, orchestration, management and policy.

The primary function of MSO 225 is the automation of end-to-end service instance provisioning activities. As shown in FIG. 5, MSO 225 includes a request handler 501, an orchestration engine 503, adapters 505, and service catalog service recipes 507. MSO provides an interface to orchestrate delivery of integrated cloud environment services. In general, orchestration can be viewed as the definition and execution of workflows or processes to manage the completion of a task. The ability to graphically design and modify a workflow process is the key differentiator between an orchestrated process and a standard compiled set of procedural code. Orchestration provides adaptability and improved time-to-market due to the ease of definition and change without the need for a development engagement. As such, it is a primary driver of flexibility in the architecture. Interoperating with policies, the combination provides a basis for the definition of a flexible process that can be guided by business and technical policies and driven by process designers.

Orchestration exists throughout the integrated cloud environment architecture and is not be limited to the constraints implied by the term "workflow" as it typically implies some degree of human intervention. Orchestration in integrated cloud environment will not involve human intervention/decision/guidance in the vast majority of cases. The human involvement in orchestration is typically performed up front in the design process although there may be processes that will require intervention or alternate action such as exception or fallout processing.

To support the large number of Orchestration requests, the orchestration engine 503 will be exposed as a reusable service. With this approach, any component of the architecture can execute process recipes. Orchestration services will be capable of consuming a process recipe and executing against it to completion. The Service model maintains consistency and reusability across all orchestration activities and ensures consistent methods, structure and version of the workflow execution environment.

As shown in FIG. 5, DCAE module 227 includes an analytic applications module 509, streaming framework 511, an events pub/sub 513, real-time collectors 515, APIs 517 and batch collector 519. In the integrated cloud environment virtualized functions across various layers of functionality are expected to be instantiated in a significantly dynamic manner that requires the ability to provide real-time responses to actionable events from virtualized resources, applications, as well as requests from customers, carrier partners and other providers. In order to engineer, plan, bill and assure these dynamic services, DCAE module 227 within the framework of the ECOMP platform 100 gathers key performance, usage, telemetry and events from the dynamic, multi-vendor virtualized infrastructure in order to compute various analytics and respond with appropriate actions based on any observed anomalies or significant events. These significant events include application events that lead to resource scaling, configuration changes, and other activities as well as faults and performance degradations requiring healing. The collected data and computed analytics are stored for persistence as well as use by other applications for business and operations (e.g., billing, ticketing). More importantly, the DCAE module 227 has to perform a lot of these functions in real-time.

DCAE module 227 provides real-time collectors 515 necessary to collect the instrumentation made available in the integrated cloud infrastructure. The scope of the data collection includes all of the physical and virtual elements (compute, storage and network) in the integrated cloud infrastructure. The collection includes the types of events data necessary to monitor the health of the managed environment, the types of data to compute the key performance and capacity indicators necessary for elastic management of the resources, the types of granular data (e.g., flow, session & call records) needed for detecting network & service conditions, etc. The collection will support both real-time streaming as well as batch methods of data collection.

DCAE module 227 needs to support a variety of applications and use cases ranging from real-time applications that have stringent latency requirements to other analytic applications that have a need to process a range of unstructured and structured data. DCAE module 227 needs to support all of these needs and must do so in a way that allows for incorporating new storage technologies as they become available. This may be done by encapsulating data access via APIs and minimizing application knowledge of the specific technology implementations.

Given the scope of requirements around the volume, velocity and variety of data that DCAE module 227 needs to support, the storage may use technologies that Big Data has to offer, such as support for NOSQL technologies, including in-memory repositories, and support for raw, structured, unstructured and semi-structured data. While there may be detailed data retained at the edge layer of DCAE module 227 for detailed analysis and trouble-shooting, applications may optimize the use of bandwidth and storage resources by ensuring they propagate only the required data (reduced, transformed, aggregated, etc.) for other analyses.

The DCAE module 227 includes an analytic framework which is an environment that allows for development of real-time applications (e.g., analytics, anomaly detection, capacity monitoring, congestion monitoring, alarm correlation etc.) as well as other non-real-time applications (e.g., analytics, forwarding synthesized or aggregated or transformed data to Big Data stores and applications); the intent is to structure the environment that allows for agile introduction of applications from various providers (Labs, IT, vendors, etc.). The framework supports the ability to process both a real-time stream of data as well as data collected via traditional batch methods. The analytic framework supports methods that allow developers to compose applications that process data from multiple streams and sources. Analytic applications are developed by various organizations, however, they all run in the DCAE module 227 and are managed by a DCAE controller (not shown). These applications are micro-services developed by a broad community and adhere to the standards of the ECOMP platform 100.

The following list provides examples of types of applications that can be built on top of DCAE module 227 and that depend on the timely collection of detailed data and events by DCAE module 227. Analytics applications will be the most common applications that are processing the collected data and deriving interesting metrics or analytics for use by other applications or operations. These analytics range from very simple ones (from a single source of data) that compute usage, utilization, latency, etc. to very complex ones that detect specific conditions based on data collected from various sources. The analytics could be capacity indicators used to adjust resources or could be performance indicators pointing to anomalous conditions requiring response. The Fault/Event Correlation application is a key application that processes events and thresholds published by managed resources or other applications that detect specific conditions. Based on defined rules, policies, known signatures and other knowledge about the network or service behavior, this application would determine root cause for various conditions and notify interested applications and operations. A performance surveillance and visualization application provides a window to operations notifying them of network and service conditions. The notifications could include outages and impacted services or customers based on various dimensions of interest to Operations. They provide visual aids ranging from geographic dashboards to virtual information model browsers to detailed drilidown to specific service or customer impacts. The capacity planning application provides planners and engineers the ability to adjust forecasts based on observed demands as well as plan specific capacity augments at various levels, e.g., network functions virtualization infrastructure (NFVI) level (technical plant, racks, clusters, etc.), Network level (bandwidth, circuits, etc.), Service or Customer levels. A testing and trouble-shooting application provides operations the tools to test and trouble-shoot specific conditions. They could range from simple health checks for testing purposes, to complex service emulations orchestrated for troubleshooting purposes. In both cases, DCAE module 227 provides the ability to collect the results of health checks and tests that are conducted. These checks and tests could be done on an ongoing basis, scheduled or conducted on demand. Some components of integrated cloud environment may expose new targets for security threats. Orchestration and control, decoupled hardware and software, and commodity hardware may be more susceptible to attack than proprietary hardware. However, software defined networks (SDN) and virtual networks also offer an opportunity for collecting a rich set of data for security analytics applications to detect anomalies that signal a security threat, such as distributed denial of service (DDoS) attack, and automatically trigger mitigating action. The applications that are listed above are by no means exhaustive and the open architecture of DCAE module 227 will lend itself to integration of application capabilities over time from various sources and providers.

Figure 6:
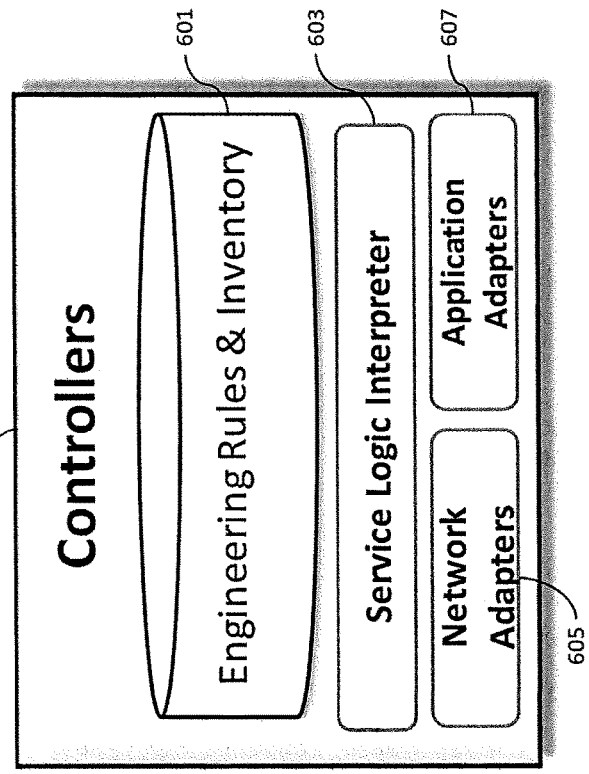
FIG. 6 is a block diagram of the components for the controllers of the platform for enhanced control, orchestration, management and policy.

Illustrated in FIG. 6 are the components of the controllers 229. Controllers 229 include an engineering rules and inventories module 601, a service logic interpreter module 603; a network adapter module 605, and an application adapter module 607. Controllers are applications which are intimate with cloud and network services and execute the configuration, real-time policies, and control the state of distributed components and services.

ECOMP platform 100, as described in FIGS. 1-6, can be modified for alternative implementations of a "network operating system" for software-defined networks, such as the Open Networking Automation Platform (ONAP). ONAP is an open-source architecture and as such presents additional complexity and programming variance into the environment.

Whether in ECOMP, ONAP, or other environments, development for software-defined networks presents challenges relating to the use of disparate languages and models. The distributed nature and mixture of commodity, enterprise, and other clouds makes cross-platform collaboration and integration, including, e.g., use and reuse of information and data types, relationship and dependency management, and data graph generation impossible with existing data dictionaries or converters. Laborious manual management of cross-references is also limited by the exposure and comprehension of developers and cannot auto-update to modify relationships or ensure that relationships are properly updated before data or data types are deleted.

Figure 7A:
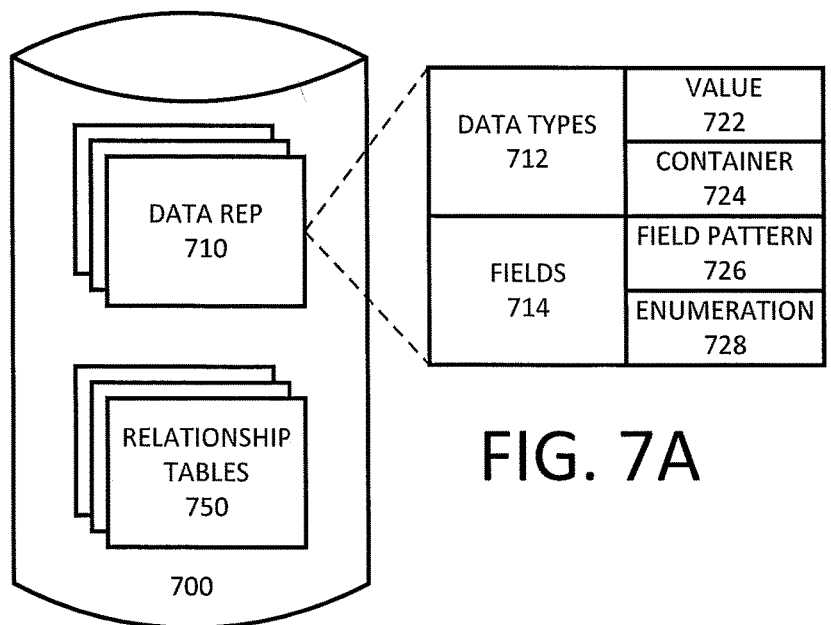
FIG. 7A is a block diagram of an embodiment of a data model database disclosed herein.

FIG. 7A illustrates an example data model database 700. Data model database 700 illustrates an example embodiment of a database configured to overcome the limitations of well-understood data dictionaries and similar solutions. Data model database 700 includes data representation tables 710 and relationship tables 750.

Data representation tables 710 include data types 712. Data types 712 are a table of data types representing specific data types of the database. This includes, in various embodiments (but is not limited to) the name of the data type, the classification of the data type (described herein), any parent data type(s) for which the type is subclassed, a specification as to whether the data type is a container (and if so the container type), user-level metadata regarding the data type (e.g., comments), auditing metadata about the data type (e.g., creation time, last update time, identification of creator and updaters), parsing metadata about the data type (e.g., to assist in lossless recreation of the data type in its original language), and constraints on the data type.

Data classification in the disclosed data model database 700 accords with an unconventional arrangement. A given piece of data has a "concept" of what is represented, but is represented according to various languages and formats. Returning to the earlier example of an IPv4 address, different languages provide myriad ways apiece to represent an address. For example, a JSON schema can include a "native" representation for an IPv4 address in the form of a string in a dotted-quad notation. A JSON schema string layout may require that this be enclosed in quotes and encoded in, e.g., Unicode. A similar arrangement can be provided in YAML, but YAML may not require the use of quotes. Postgres has two native types for IPv4 (and IPv6), called inet and cidr (although the latter is intended to represent networks). The specific representation is opaque but Postgres possesses several means for communicating these data types, which can include, e.g., formatted string or binary representations. An IPv4 address may be represented as an unsigned 32-bit integer (Uint32), which can be represented as a sequence of 4 byes in little-endian order or a string of digits in an encoding format.

To manage these various alternatives, data model database 700 utilizes classifications of symbol, concrete, and carrier types. For ease of understanding, the following formatting conventions are observed when describing type names:

- A symbol type name is in italics, for example, IPv4 or timestamp;
- a concrete type has only its first letter capitalized, for example, String or Integer;
- a carrier type name has the format <system>-<name>, for example JSON-string or Postgres-bigint; and
- a regular type (e.g., composite, as described herein) name does not follow the above conventions, but is non-italic, first letter lowercase, and includes no hyphens, for example, maskedIP or routing_table.

It is noted that this formatting is provided for illustrative purposes only, and forms no portion of the classification, formatting, syntax, or other functional portion of technologies disclosed herein.

A symbol data type describes the "concept" of the data type in a platform-agnostic format, and can be represented according to multiple concrete types. The symbol type abstracts away details of representation and represents a unit of data, such as an integer, timestamp, IP address, or others, with an exact representation deferred until more details are needed for a particular use. A symbol type facilitates substitutions, conversions, and cross-comparisons. A concrete type is a data type that has a specific matching type in some target schema. Examples of concrete types include (but are not necessarily limited to) a string, subject to constraints, or an integer, subject to constraints. A carrier type is a system-specific type, representing the symbol and/or concrete types according to a specific schema. Carrier types, such as, e.g., YAML-string, JSON-string, Postgres-text, can be encoded according to various techniques (e.g., Unicode or ASCII).

While mapping the details of carrier types is important for, e.g., data translations, the extensive details make mappings complex. To reduce complexity, a concrete type layer is not tied to the specific representation system of the carrier type layer. Symbol types resolve to concrete types and concrete types resolve to carrier types.

Figure 7B:
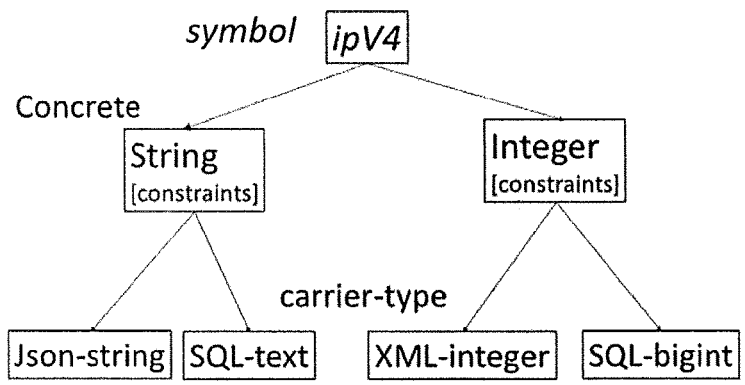
FIG. 7B is an example expansion of a data type in a data model database disclosed herein.

FIG. 7B illustrates the earlier example of an IPv4 addresses according to this classification. The symbol type is the "concept" of an IPv4 address. Carrier types include, but are not limited to, a JSON string or SQL text type (as implementations of the string concrete type) and an XML integer or SQL bigint (as implementations of the integer concrete type).

Figure 7C:
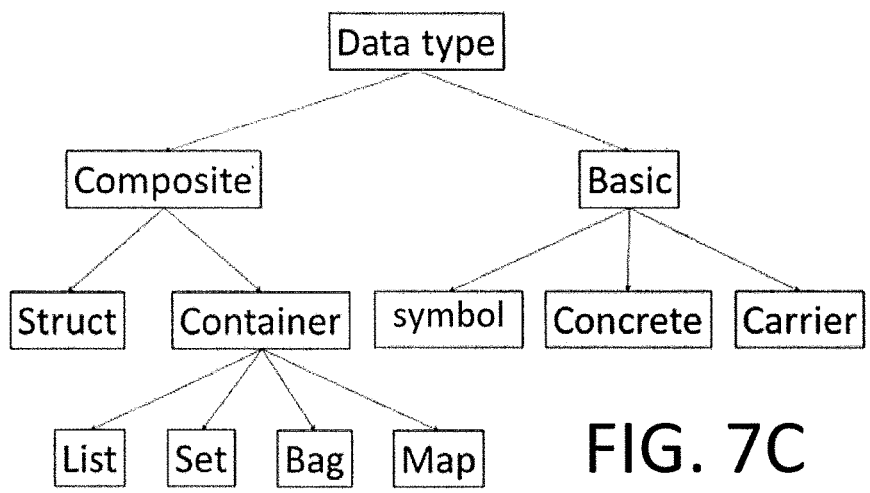
FIG. 7C is an example data type taxonomy of a data model database disclosed herein.

Further aspects of the classification system utilized in data model database 700 involve composite types, which are data types composed from one or more other types. A struct composite type includes one or more fields of other types, and a container type is a container for one or more other types (e.g., list, set, bag, map). FIG. 7C illustrates an example taxonomy including the composite types.

In contrast to composite types, a basic type contains no other types. Basic types include symbol, concrete, and carrier types, or can be derived from a basic type by adding constraints, which can be stored in, e.g., value constraint table 722, container constraint table 724, field pattern constraint table 726, and/or enumeration constraint table 728. For example, an orchestration_status type can be derived from a String by adding a constraint that any instance take a value selected from pending-create, created, active, pending-delete, or deleted. Composite types can have mixture of symbol, concrete, and carrier elements.

A derived type inherits the properties of a parent type, and adds constraints and/or fields to the parent type. Since a derived type is at least as constrained as the parent type, and contains at least the parent's fields, a record of the parent type can be formed by discarding extra fields of the child type.

Inheritance cannot change the basic nature of the data type: if the parent is basic/struct/container, the child must also be basic/struct/container. Therefore, a type that inherits from a basic type or a container type cannot add fields. A type that inherits from a basic type can add constraints to the basic types, e.g. facets, as discussed in relation to constraint tables and other portions herein. A type that inherits from a struct type can add constraints to the pattern of fields that can exist.

In some modeling languages (e.g., XSD) it is possible to add constraints to deeply nested fields. In the context of data model database 700, a data type d' that inherits from data type d can override a field of d by changing the type f of field f with f', which is derived from f either directly or transitively.

A container type can have constraints related to the container (e.g., size constraints). A container type can also replace contained types with descendants of the contained types. All added constraints must be compatible with the constrained things (e.g., container constraints for containers as stored in container constraints table 724) and type-specific constraints for basic types.

A type that inherits from a symbol basic type is also symbol and basic, and a type that inherits from a concrete basic type is also concrete and basic. So for example, an orchestration_status type can be defined by inheritance from concrete type String, and therefore is also concrete.

A symbol composite type is one which is (transitively) composed of at least one symbol basic type. That is: a data type which directly depends on (through fields or contained types) at least one symbol basic type is a symbol composite type; and a data type that depends on (through fields or contained types) a symbol composite type is a symbol composite type.

A pure symbol composite type is transitively composed of only symbol types. A pure concrete composite (or pure concrete) type is transitively composed of only concrete types. Similarly, a pure carrier composite (or pure carrier) is transitively composed of only carrier types. A strict symbol type is a basic symbol type with no constraints, and a strict concrete type is a basic concrete type with no constraints.

For example, consider the definition of a d_mixed type:
d_mixed:
alpha: String
beta: integer Data type d_mixed is a symbol composite type because it contains a symbol type, integer, as one of its basic types. However it is neither pure symbol nor pure concrete.

For another example, consider d_symbol:
d_symbol:
alpha: string
beta: integer

Type d_symbol is pure symbol because all of its basic data types are symbol.

In another example, consider d_concrete:
d_concrete:
alpha: String
beta: Integer Type d_concrete is pure concrete because all of its basic data types are concrete.

In another example, consider d_complex:
d_complex:
gamma: d_symbol
delta: d_concrete Type d_complex is transitively a symbol composite type because one of its components is d_symbol, which is a symbol composite type. However d_complex is not pure symbol because it is not composed only of pure symbol types.

A symbol basic type can be a representation of a concrete basic type (integer), or it can be a representation of a larger construction (e.g., routing_table). A concrete representation of a routing_table might be a composite type. One symbol basic type can be derived from another by adding constraints.

The symbol type integer represents any integer type. However, many carrier types (e.g., Postgres-integer, Postgres-smallint) have a restricted range. In many cases, a field with a symbol type (e.g., integer population) should not be stored on a carrier type with a small range (e.g., Postgres-smallint). If the data type author wishes to make the required range of field population explicit, they can use a symbol type which is derived from integer by adding constraints. These constraints can be interpreted as the range of the integers (or other symbol types) stored by the constrained symbol type.

In an example, a type bigint can be derived from integer with the constraint that its range is in $[-2^{63}, 2^{63}-1]$. By stating this population is of type bigint, the data type authors can place constraints on any carrier type used to represent the field population (e.g., that its range be at least $[-2^{63}, 2^{63}-1]$). Similar types such as longint or shortint can be derived from integer, with constraints limiting respective ranges to different values (e.g., bounding greater_equal or less equal range values).

The constraints used for a symbol type must match the symbol type. For example, a constraint greater_equal: $-2^{63}$ matches the symbol type integer. Symbol types that have direct mappings to concrete types (and therefore have carrier types) generally come from a small collection of well-known types: integer, string, float, bool, et cetera, and have well-established constraints. However not all symbol types with matching concrete types have well-established constraints, and the authors of a data type containing the field population might choose to use the symbol type integer. In these cases, the burden is placed on the user which maps symbol types to concrete, and then carrier, types to choose appropriate substitution mappings.

Symbol types can have a complex hierarchy of mappings from the most generic symbol type (i.e., a strict symbol type) to specific representations in a carrier types. In an example, an IP_address type can represent both IPv4 and IPv6 addresses. If the authors of a data model wish to be specific about the type of IP address, they can use the derived symbol types, IPv4_address or IPv6_address. These types have many representations, one of which is the concrete type Cidr. Therefore both IPv4_address and IPv6 address have mappings to Cidr types with appropriate constraints (if available on the Cidr type). The symbol type IP_address also has a mapping to the concrete type Cidr, and all of the Cidr types have mappings to the carrier type Postgres-cidr. However there are many possible representations of IP_address, one of which is ip_address, which is a composite struct type consisting of a bool and an array of 16 bytes. The symbol types bool and byte have further mappings.

Relationship tables 750 can describe a variety of relationship types. For example, the symbol types IPv4_address and IPv6_address are derived from IP_address. The mappings to Cidr and ip_address use a Concrete_type_of relationship (discussed herein). The mappings from Cidr to Postgrescidr use the Carrier_type_of relationship, discussed herein.

The Carrier_type_of relationship, which can be one or more of tables stored in relationship tables 750, defines which carrier types can represent a concrete type, and maps a concrete type to a carrier type:
Carrier_type_of(concrete_type, carrier_type)

For example, the above example describes the relationship:
Carrier, type_of(Cidr, Postgres-cidr)

In embodiments, the number of carrier types and concrete types may be small, and the concrete_type_of relationship may be small. Therefore concrete and carrier types can be carefully crafted and mapped via the Carrier_type_of relationship.

However, it is possible to extend the Carrier_type_of relationship with a relationship that describes whether one data type can be represented by another data type, referred herein as the "rep_by" relationship. It is understood this and other relationships referred herein can be given other names or notations without departing from the scope or spirit of the innovation. Rep_by can relate a concrete_type to a concrete type, or a carrier_type to a carrier type:
rep_by (concrete_type, concrete_type)
rep_by (carrier_type, carrier_type)

The idea behind rep_by(D1, D2) is that D1 and D2 have "compatible" representations (e.g., both are strings, both are integers) and every valued in D1 exists in D2. For example, let Int32 be a signed 32-bit integer, Uint32 be an unsigned 32-bit integer, and Int64 be a signed 64-bit integer. It follows that:

rep_by (Int32, Int64)
rep_by (Uint32, Int64)

However it may not follow that either rep_by (Int32, Uint32) or rep_by (Uint32, Int32).

The rep_by relationship can be used to extend the carrier_type_of relationship by using the following two inference rules:

If carrier_type_of(D1, X-D2) and rep_by(X-D2, X-D3), then carrier_type_of(D1, X-D3); and If rep_by(D1, D2) and carrier_type_of(D2, X-D2) then carrier_type_of (D1, X-D2).

An example of carrier_type_of inference using concrete types Int32, Int64, Uint32, and carrier types Postgres-integer and Postgres-bigint is provided where:

Int32 and UInt32 is rep_by Int64;
Postgres-integer is Carrier_type_of Int32; and
Postgres-integer is rep_by Postgres-bigint, a Carrier_type_of Int64, and an inferred carrier_type_of Int32 and Uint32.

The natural carrier_type of Int32 within Postgres is Postgres-integer. However Postgres-bigint is a larger type (as stated by rep_by(Postgres-integer, Postgres-bigint)), so it can be inferred carrier_type_of(Int32, Postgres-integer). This inferred relationship can be useful if the user desires, for example, that all integer types in Postgres be uniform. Conversely, there is no natural carrier_type of Uint32 in Postgres, so the data type database maintainer might not create any mappings from Uint32 to a data type in Postgres. However, rep_by(Uint32, Int64) and so it can be inferred that the carrier_type of Int64, Postgres-bigint, can serve as a carrier_type of Uint32.

Given that rep_by is useful for inferring additional carrier_type_of relationships, it would be useful to automatically infer rep_by relationships also. The definition of rep_by makes one kind of inference easy, as rep_by is transitive:

If rep_by(D1, D2) and rep_by(D2, D3), then rep_by(D1, D3).

It can be observed that if concrete type C1 is derived_from C2, then C1 has constraints in addition to those which constraint C2, and so every c in C1 is also in C2. Therefore:

If C1 and C2 are basic concrete, and C1 is derived_from C2, then rep_by(C1, C2) This derived_from inference rule is used to infer that the carrier_type of the constrained Cidr concrete types is Postgres-cidr. The relationship carrier_type_of(Cidr, Postgres-cidr) would exist in the data type database, and the carrier_type_of relationship can be inferred automatically for all concrete types derived_from Cidr.

It is possible to develop automated inference rules for carrier and concrete types, based on reasoning on the properties of the types, expressed as constraints. One framework for this reasoning is to use two types of constraints, which can be stored in the constraint tables (e.g., value constraints 722, container constraints 724, field pattern constraints 726, and enumeration constraints 728) of data model database 700. First, range constraints describe the range of values that can be represented in the type. For example, integer greater than and less than constraints are range constraints. Next encoding constraints describe how "fine grained" the encoding of the data is. For example, Unicode is a larger encoding that ASCII.

For a data type D, let r(D) be its range constraints and e(D) be its encoding constraints. So: r(D1)<=r(D2) if the range of D1 is smaller than or equal to the range of D2 (similarly for e(D)). From this the inference meta-rule can be developed:

If r(D1)<=r(D2) and e(D1)<=e(D2), then rep_by(D1, D2).

An algorithm for computing r(D1)<=r(D2) or e(D1)<=e(D2) is not generalized as these rules are domain specific. However, these rules can be automated and applied in specific domains.

For an example, consider the collection of Postgres numeric types (except for auto-increment types). Such numeric types can be described according to a name, storage size, description, and range. The types can include smallint (2 byte), integer (4 byte), bigint (8 bytes), decimal (variable size), numeric (variable size), real (4 byte), and double precision (8 byte). Based on range and encoding properties, a skeleton of the rep_by relationships among the Postgres numeric types can be derived, which shows that smallint is rep_by integer is rep_by bigint is rep_by decimal or numeric, and that real is rep_by double precision is rep_by decimal and numeric, and that decimal is rep_by numeric and numeric is rep_by decimal. This collection of rep_by relationships is the transitive closure of relationships for these types.

There is also a concrete_type_of relationship. As the examples suggest, the concrete_type_of relationship maps a basic symbol type to another type. The target type can be any type in the database, except for another basic symbol type. That is, valid target types are concrete basic types and composite types (struct and container).

With regard to symbol type substitution, symbol types can be used to help determine composite type similarity, and to enable translation from one data representation to another. A relationship can be defined between types:

concrete_type_of (symbol, replacement)

to indicate that replacement is a (more) concrete representation of type symbol. The type symbol must be a symbol basic type, and the type replacement cannot be a symbol basic type. For an example, consider the symbol boolean type. There are several concrete representations, including Boolean (the concrete native Boolean type in, e.g., JSON), boolean_str (derived from String with the constraint that it take a True or False value), and boolean_int (derived from Integer with the constraint that it take a 0 or 1 value). The following three relationships can be asserted:

concrete_type_of(boolean, Boolean)
concrete_type_of(boolean, boolean_str)
concrete_type_of(boolean, boolean_int)

This relationship can be used to create a pure concrete composite type from a symbol composite type. For example, given the data type:

Vm_status:
Uptime: Integer
Failed: boolean

Vm_status can be transformed into pure concrete type Vm_status_str by substituting symbol type boolean for a concrete type such that boolean is the first position of a concrete_type_of relationship. For example, Vm_status_str:
Uptime: Integer
Failed: boolean_str The target of the concrete_type_of relationship does not need to be a pure concrete type. However it should be "more concrete" than the source. For example, consider a symbol data type routing_table. One representation of a routing table could be, using a simplified data type description language:

Routing_table_a:

List:

subnet: masked IP_address interface: Integer subnet is of type masked_IP_address, which is a symbol type. There are many representations of a masked_IP_address. One is the concrete type Masked_IP_address, which has the carrier_type postgres-cidr. Another is a type masked_ip which is a pair (IP: IP_address, mask: Integer). masked_ip is a symbol type because IP_address is a symbol type with many possible representations. These relationships can be asserted by:

concrete_type_of(routing_table, routing_table_a)

concrete_type_of(masked_IP_address, Masked_IP_address)

concrete_type_of(masked_IP_address, masked_ip)

As suggested data model database 700 also includes inferred relationships, which can be explicitly or inferentially stored in one or more of relationship tables 750. Many relationships (e.g., concrete_type_of relationships) can be inferred. Let a be a symbol type and let C be a concrete type such that the relationship concrete_type_of(a, C) is asserted. Let a' be a type that is derived-from a by adding constraints. Let C' be derived from C by adding the new constraints of a' to C'. It can be asserted concrete_type_of(a C'). If C' does not exist, it can be constructed as long as the new constraints of a' can be applied to C.

Relationships can be used to provide expansion trees for particular types. Because the target of the concrete_type_of relationship is only lightly constrained, it is possible for various anomalies to occur. For example, the process of replacing a symbol data type with its concrete_type_of target might proceed indefinitely. For another example, it might not be possible to transform a symbol data type into a pure concrete data type using only the replacement transformations in concrete_type_of.

To determine whether concrete_type_of substitutions can lead to a valid concrete type, the expansion tree can be developed (expanding symbol types into concrete types). There are two types of nodes in an expansion tree, component nodes and expansion nodes, and two kinds of edges, expansion edges and component edges. Expansion edges lead from component nodes to expansion nodes, and component edges lead from expansion nodes to component nodes.

Given composite data type d, let ref set(d) be the set of all data types directly and transitively referenced by d. For example, if d is a struct with fields {foo: e, bar: g, zed: e}, then set ref set(d)={e, g}. If d is a map with key k and value v, then ref set(d)={k, v}. If v is a composite type with fields {v1, v2}, then v can be replaced by v1 and v2, for example, ref set(d)={k, v1, v2}.

Let direct_ref(d) be the set of data types referenced by d. That is, it can be asserted that direct_ref(d)={e, g} (or {k, v}) without further processing. To compute ref set(d), the following algorithm can be applied:

Set ref_set(d)=direct_ref(d); and

While there is a composite type c in ref_set(d), set ref_set(d)=ref_set(d) Union direct_ref(c) Minus c.

It is understood that this algorithm is for example purposes only, and others can be utilized without departing from the scope or spirit of the innovation.

The expansion tree of symbol data type d, expansion(d), is constructed recursively by the following rules:

The root, r, of the expansion(d) is a component node labeled with d';

if a component node c is labeled with d, d is symbol basic, and d occurs only once (i.e., at c) in the root to leaf path from r to c, then for each rule in concrete_type_of with source d and target d', create an expansion node e labeled with d' and an substitution edge from c to e; and if an expansion node e is labeled with d, and d is not basic, and occurs only once (i.e., at e) in the root-to-leaf path from r to e, then for each d' in ref_set(d), create a component node c with label d' and a component edge from e to c.

The single-occurrence rule ensures that the tree is finite.

In an example, an expansion tree of d1 can have a root, a component node labeled with d1. There can be three concrete_type_of rules, so three expansion nodes (e.g., having types E1, e2, and e3). E1 can be a basic concrete type so no further expansion is performed. Data type e2 can be a struct containing basic types D4 and d6. D4 can be concrete, but d6 can be symbol. There are no concrete_type_of rules with d6 as the source, so no further nodes are created. Data type e3 can be a struct containing basic concrete type D7 and basic symbol type d8. There can be two concrete_type_of rules with d8 as the source, with targets e4 and e5. Data type e4 can expand to D9 and d8. D9 can be basic concrete, and d8 can appear in the root-to-leaf path, so no further expansion is performed. Data type e5 can expand into d1 and basic concrete type D7. Type d1 is the root, so no further expansion is performed.

Data model database 700 also facilitates cyclic expansions. A basic symbol data type d has cyclic expansions if there is some leaf I in expansion(d) with label d' such that d' occurs twice in the root-to-leaf path from r to I. Basic symbol data type d has root-cyclic expansions if there is some leaf I in expansion(d) such that I is labeled with d. Every data type d that has cyclic expansions either has root cyclic expansions, or expansion(d) contain a node labeled with d' where d' has root-cyclic expansions.

Even if a symbol data type d has cyclic expansions, it might have some expansions which are not cyclic. The following is an algorithm that can mark concrete_type_of substitution rules as leading to invalid results:

In expansion(d), mark all leaves which appear twice in their root-to-leaf path as cyclic. This marking can be performed while computing expansion(d);

Starting from the leaves and working recursively towards the root: an expansion node is marked cyclic if at least one of its children is marked cyclic; and a component node is marked cyclic if each of its children is marked cyclic.

For example, consider the expansion tree expansion(d1) described above. Leaves d8 and d1 are marked as cyclic because their data type occurs twice in their root-to-leaf path. Moving one level up, e4 and e5 are marked cyclic because they are expansion nodes and one of their children is marked as cyclic. Moving up again, component node d8 is marked cyclic because both of its children are marked cyclic. Moving up a last time, expansion node e3 is marked cyclic because at least one of its children is. The root node is not marked cyclic because it is a component node and it has at least one child not marked as cyclic.

If the root of the expansion tree is not marked cyclic, then there are valid concrete_type_of substitutions that can lead to an equivalent (and more concrete) representation. All concrete_type_of rules which correspond to a substitution edge leading from an unmarked component node to a marked expansion node must be avoided.

Algorithms can also be established for finding incomplete substitutions. Cyclic expansions can correspond to errors in the concrete_type_of substitution rules. Let acyclic_expansion(d) be the expansion(d) with all subtrees rooted with a node marked cyclic removed. In acyclic_expansion(d), there may be concrete_type_of substitution rules that lead to expansions which contain basic symbol data types that are not the source of any concrete_type_of rules. While these paths are not incorrect, user intervention may be employed to replace any remaining basic symbol data types with pure concrete equivalents. An algorithm for finding incomplete substitutions is similar to that for finding substitutions:

In acyclic_expansion(d), mark all leaves which are symbol as incomplete. This marking can be performed while computing expansion(d);

Starting from the leaves and working recursively towards the root: an expansion node is marked incomplete if at least one of its children is marked incomplete; and a component node is marked incomplete if each of its children is marked incomplete.

If a node is not marked incomplete, it can be considered complete. For an example, consider the tree acyclic_expansion(d1). Leaf d6 is symbol, and therefore incomplete. Its parent, e2, is an expansion node, and is therefore incomplete because one of its children is incomplete. The parent of e2, d1 is complete because at least of its children is complete.

Expansion trees can be used to transform symbol types to pure concrete types. The expansion tree of symbol basic data type d indicates the possible choices for converting d into a concrete type. There are two basic approaches for using the expansion tree. In the first, a choice can be made for a replacement for d selected from among its children nodes which are neither marked as cyclic nor incomplete (or, alternatively, not marked cyclic regardless of whether marked incomplete). The replacement for d, e, might have a symbol basic type d' in ref_set(e), but the choice of replacement type for d' is deferred. In the second, a replacement is chosen for each symbol basic data types in the tree defined by the chosen edges among the expansion edges. This can be performed via the following algorithm:

Set worklist=[d];
Set chosen_edges={ }
While worklist is not empty:
Extract and remove d' from the front of worklist;
Choose an expansion edge X that leads to an expansion node e that is not marked cyclic or incomplete (alternatively, not marked cyclic) and add X to chosen_edges.
For each component node c that is a child of e, if c is basic symbol, add c to the end of worklist.

In the example expansion tree described above, a basic symbol type d1 has two replacements that are neither incomplete nor cyclic, E1 and e3. The first approach would choose either of the two and stop. If e3 is chosen, then eventually the substitution process will need to replace d8, but that choice is deferred until d8 is encountered, in which case the expansion tree of d8 would be built. The second approach would find all of the replacements. If e3 is chosen to replace d1, then the algorithm would find that d8 is a basic symbol data type among the component nodes of e3. The algorithm would continue and choose e4 as the replacement of d8. Since e4 has only concrete basic types in its ref_set, the algorithm stops.

Transformation of a symbol data type to a pure concrete data type relies on the dependency tree (discussed herein).

Before a data type can be deployed, it must be transformed into a pure carrier data type, which relies on the dependency tree (discussed herein).

Similarity can be determined using symbol types. Give, for example, two flow measurements, flow_a and flow_b:
Flow_a:
Source: IPv4_str
Dest: IPv4_str
Packets: Integer
Collection_time: timestamp_float
Flow_b:
SourceIP: IPv4_int
DestIP: IPv4_int
Sum: Integer
Measurement time: timestamp_ieee Where IPv4_str represents an IPv4 address using a dotted-quad string, IPv4_int uses a 32-bit Uint, timestamp_float represents a timestamp using the seconds since 1970-01-01 00:00:00, and timestamp_ieee uses the IEEE standard for representing a timestamp as a string. The following relationships are then in the concrete_type_of table:
concrete_type_of(IPv4, IPv4_str)
concrete_type_of(IPv4, IPv4_int)
concrete_type_of(timestamp, timestamp_float)
concrete_type_of(timestamp, timestamp_ieee)

By substituting symbol for concrete from the concrete_type_of relationship, flow_a and flow_b can be transformed into:
Flow_a_sym:
Source: IPv4
Dest: IPv4
Packet s: Integer
Collection_time: timestamp
Flow_b_sym:
SourceIP: IPv4
DestIP: IPv4
Sum: Integer
Measurement time: timestamp Because flow_a_sym and flow_b_sym are quads with the same collections of types, flow_a_sym and flow_b_sym have a high similarity. Therefore flow_a and flow_b have a high similarity even though they appear to be or may actually be composed of different types.

An algorithm for similarity can involve reverse-matching the concrete_type_of rules. Termination can be expected because the one-to-one match is basic concrete to basic symbol. Other rules reduce the number of fields in the fully expanded data type tree.

The replacement process can have branching if there is more than one source for a given target. A constrained field can be an anonymous data type, which can be used to search for types in the target of concrete_type_of. There can be multiple targets, e.g., separate field constraints form data type, or combine them. Another source of multiple targets includes multiple entries with the same target, e.g., concrete_type_of(a1, c1), concrete_type_of(a1, c2).

With classification and similarity explained, additional information regarding representations of data model database 700 are set forth below.

There can be a variety of container types, with details defined at least in part by container constraints 724. Information about container types (e.g., list, set, bag, map, and others) can be represented in multiple ways. To limit ambiguity, several options are available, including:

Defining containers are as the data_type record; that is, type Foo can be a list of integers, and field bar can be of type Foo, but field bar cannot be a list of integers;

Defining containers at the fields; that is, type Foo can be an integer, but not a list of integers, and field bar can be a list of Foo (or a list of integers directly); or Containers can be defined both as data types and as properties of fields.

Most data modeling languages (e.g. xsd, tosca, json schema) define container types at the fields (with some exception for map types in XSD). This convention is a convenience for the model developer, as the developer can create a field which is, e.g., a list of integers, without searching for a pre-existing definition or defining the list type before continuing. Therefore, specifying containers when defining fields is convenient for the model developer.

However, saying that field Foo is a list of integers creates an anonymous type. These anonymous types are make searching and similarity more difficult, as cross-referencing (both by the user and by any analysis software) may be required to verify that two anonymous types "mean" the same thing. Furthermore, specifying container types at fields requires a duplication of effort, which can lead to errors and inconsistencies. Therefore, the cleanest model of container types always defines containers as data types, and never anonymously at fields.

Furthermore, if containers must be defined as fields, not data types, then some constructions cannot be modeled. For example, it can be desirable to define a list of Integers which must contain at least 1 and no more than 10 elements as a data type. Therefore, a core requirement for a universal data type dictionary is that data types can be container types.

The approach disclosed herein does not rely on anonymous data types at the fields. Instead, whenever a struct data type D has a field f which is a container, e.g. list<C>, a container data type D', with payload C, is created and is also inserted into the database. The type of D.f is changed to D', and then D is inserted into the database. As an optimization, the database can be checked for a matching data type which already exists.

While alternatives are available, any choice for the representation of container types involves benefits and drawbacks, and the representation described herein may simplify discussion of the analysis of the contents of the database. However, if a data type with a field that is a container of another type is stored in the database, its in-database representation shows a structure that is different than its textual representation because the anonymous type has been explicitly named and separately recorded.

However, by making use of appropriate parsing metadata in the data type schema, enough information can be stored to recreate the original textual structure. For example, when list<C> is stored as data type D', a parsing metadata indicator can be added that D' was originally an anonymous type. Then when reconstructing D to its textual representation, list<C> can be substituted for D' as the data type of field f.

To provide examples for a data_type schema (for, e.g., data types table 712) and a field schema (for, e.g., fields table 714), example SQL CREATE TABLE data definition commands are described which can be provided for the creation of a collection of tables which in combination can represent a data type. For brevity, these schemas do not contain auditing metadata but those of ordinary skill in the art understand incorporation of such aspects. Parsing metadata is also omitted, as many kinds can be included. When parsing metadata is needed for, e.g., textual reconstruction of a data type, that metadata can be included.

Italics, as used within the example schema, do not necessarily denote symbol data types. The schema is understood to be one example of a possible schema, and many equivalent representations are possible:

```
CREATE TABLE Data_type (
    name text NOT NULL,
    derived_from text REFERENCES Data_type(name),
    description text,
    data_type_class varchar(10) DEFAULT 'struct'
    CHECK(data_type class IN ('basic', 'struct ', 'list', 'set', 'map ', 'bag')) ,
    is_symbol_type boolean NOT NULL,
    is concrete_type boolean NOT NULL,
    is_carrier_type boolean NOT NULL,
    key_data_type text REFERENCES Data_type(name),
    value data type text REFERENCES Data_type(name),
    CONSTRAINT pk_data_type PRIMARY KEY(name),
    CHECK( NOT (data_type_class<> 'basic' And is_symbol_type=True)),
    CHECK( NOT (data_type_class<>'basic' And is_concrete_type=True)),
    CHECK( NOT (data_type_class<> 'basic' And is_carrier_type=True)),
    CHECK( NOT (is_carrier_type=true and derived_from IS NOT NULL)),
    CHECK( key_data_type IS NULL OR (key_data_type IS NOT NULL and key_dat a_type <>name),
    CHECK(value_data_type IS NULL OR (value_data_type IS NOT NULL and key_data_type <>name),
    ) ;
CREATE TABLE Fields (
    name text NOT NULL,
    field_of text NOT NULL,
    description text,
    type_name text NOT NULL,
    default_value text,
    required boolean NOT NULL DEFAULT false,
    FOREIGN KEY (field_of) REFERENCES Data_type(name) ON DELETE CASCADE,
    FOREIGN KEY (type_name) REFERENCES Data_type(name),
    CONSTRAINT pk_fields PRIMARY KEY(name , field_of)
);
```

Each data type has a name, which is the primary key. derived_from indicates the parent data type, if any, while description contains any comments. The next five fields classify the data type. data_type_class indicates whether the type is a container type and if so, what type (list, set, map, bag), or not a container type (struct or basic). This collection of container types is intended to be illustrative, but not an exhaustive listing of container types. Alternatively, if data_type_class='basic', then the value of the fields is_symbol_type, is_concrete_type, and is_carrier_type, indicate whether the data type is symbol, concrete, or carrier. These values can only be true if data_type_class='basic'. It is understood that checks on the proper labeling of a data type can be performed in multiple ways.

If the data type is a container type (data_type_class is list, set, or bag), then key data_type and value_data_type indicate the data types being contained. If the data_type_class is list, set, or bag, then key_data_type is the data type being contained in the data type under consideration, and value_data_type is Null. If data_type_class is map, then sub_data_type is the data type of the map's key, and value_data_type is the data type of the map's value. If data_type_class is struct or basic, then both sub_data_type and value_data_type are Null.

A container cannot contain itself (without causing infinite recursion), so if they are not null, neither keydata_type nor the value_data_type can be equal to name.

If a Data_type record has a data_type_class value of 'struct', then the data type can have a list of fields. Following conventional relational compositions, the table fields contains the field field_of, which is a foreign key that joins with data_type.name.

A field is described by its name, and field of is the name of the data type of the data type of which it is a part. (name, field_of) are the primary key of Fields. description contains user metadata about the field. The field must be of a particular type, which as its name in type_name. The default value of the field, if any, is stored in default_value. If the field must have a value (e.g., not Null), then required has value True, else False. Although required is a constraint, and there are separate constraint tables, a practice used with modeling languages may have a separate 'required' property for fields. However it is understood that the 'required' property can be moved to the collection of other constraints.

There are some constraints on the database involving derived_from that cannot be checked using localized constraints such as CHECK. Let d be a data_types record. If (again using italics to denote symbol types) d.derived_from is not NULL, then:

The value of data_type_class must be the same in the record and in the parent (named by derived_from);

if data_type_class is a container type (list, set, map, bag), then the value of value_data_type must either be equal to that of the parent, or must be a derived_from descendent of the value_data_type of the parent;

if data_type_class is a map, then the value of key_data_type must either be equal to that of the parent, or must be a derived_from descendent of the key_data_type of the parent;

if a record from the Fields table which joins to the data type has the same name as a field that is inherited through the derived_from chain, then: if field overriding is not permitted, the let f be the field name, df its data type, da be the nearest derived_from ancestor, and daf be the data type off in da; then df must be a derived_from descendent of daf; and otherwise there is no constraint on the data type of f; and The collection of name values in the records from Fields which join to the Data_type record should not intersect the set of name values in the records from Field type which join to any derived_from ancestor.

As discussed, data model database 700 includes various constraint tables. Data types may have a collection of constraints. In most data modeling languages, fields can also have constraints. However, representing constraints in multiple ways makes data representation and analysis more complex, as constraints defined at the field level create anonymous types. So, just as anonymous container types defined as field types are named and stored in the data_types table (see Section 4.1.1), anonymous types created by constraints on field values are also named and stored in the Data types table. If field f has type_name D with constraint set C, data type D' is created, derived_from D with additional constraints C, and the type_name off is set to D'. This procedure is illustrated in the example in Section 4.1.4.

Classes of constraints here include value constraints (as can be stored in, e.g., value constraints table 722). Value constraints describe the possible values of basic data types. These constraints may sometimes be called facets, following the terminology of XSD. Value constraints are generally drawn from the following collection, although additional constraints are possible:

Enumeration: declares that the values of the data type must be drawn from a supplied list of possibilities.

Pattern: declares that string data must match a specified regular expression

Min_inclusive: declares that ordered data must be larger than or equal to the specified value.

Min_exclusive: declares that ordered data must be larger than the specified value.

Max_inclusive: declares that ordered data must be smaller than or equal to the specified value.

Max_exclusive: declares that ordered data must be smaller than the specified value.

Min_length: declares data that has a size (e.g., strings) must have a size greater than or equal to the specified integer length.

Max_length: declares data that has a size (e.g., strings) must have a size less than or equal to the specified integer length.

Container constraints (stored in, e.g., container constraints table 724) describe possible values of containers as a whole. Additional constraints are possible, e.g. uniqueness of field combinations and so on, but container constraints can include:

Min_length: declares that the container has at least the number of entries specified by an integer length.

Max_length: declares that the container has at most the number of entries specified by an integer length.

Constraints can also include field pattern constraints (as stored in, e.g., field pattern constraints table 726). Tree pattern schema languages such as Yang, JSON Schema, and XSD allow for variations in the data that can be present in a node. When translated into data types, these languages allow for a pattern of fields required to be present or absent. Some examples of field pattern constraints are:

Exactly_one_of: exactly one of the specified sets of fields is present

At_most_one_of: at most one of the specified sets of fields is present.

Value constraints can apply to basic data types and to fields of a basic data type. Container constraints can apply to container data types and fields of container data types. Fields pattern constraints can apply only to data types which are not basic and are not container types.

```
CREATE TABLE Data_type_constraint (
  type_name text NOT NULL REFERENCES Data type(name) ON DELETE CASCADE ,
  id integer NOT NULL,
  description text,
  predicate type varchar(15) NOT NULL,
  CHECK(predicate_type IN ('enumeration' , 'pattern', 'max inclusive' , 'max_exclusive' , 'min_inclusive', 'max_exclusive' , ,"max_length', 'min_length', 'exactly_one_of', 'at_most_one_of')),
  literal text,
  CONSTRAINT pk_type_constraint PRIMARY KEY(type_name, id)
);
```

A common practice is to define a data type by constraining a basic data type. For example, a Boolean_string data type, representing the symbol type Boolean, can be a string restricted to the values ('True', 'False'). To make this set property searchable, additional tables are created to represent the enumeration values.

```
CREATE TABLE Enumerated_literal_data_type (
  type_name text NOT NULL,
  constraint_id integer NOT NULL,
  literal text NOT NULL,
  description text,
  CONSTRAINT pk_enumerated_literal_dt PRIMARY KEY(type_name, constraint_id, literal),
  FOREIGN KEY (type_name, constraint_id) REFERENCES Data_type_constraint(type_name, id) ON DELETE CASCADE
);
```

To illustrate how a data type can be represented in the database, consider the following Tosca example:

```
data_types:
  d1:
    derived_from: d2
    description: an illustrative example
```

```
    properties:
      alpha:
        type: integer
        constraint:
          - valid_values
            -4
            - 5
            - 45
      beta:
        type: list
        entry_schema: string
      gamma:
        type: float
```

Data type d1 has two fields (alpha and beta) that are of anonymous types. There are many ways to manage the metadata associated with the reconstruction of textual representations that have anonymous types, but for the purposes of explanation it can be assumed that the data_types table has the following field in addition to those described in the example schema above:

is_anonymous_type boolean NOT NULL,

Data type d1 is derived_from d2, is a struct type, and has a description. Therefore the SQL command for recording data type d1 is:

```
INSERT INTO Data_types(name, derived_from, description, data_type_class, is_symbol_type, is_concrete_type, is_carrier_type, is_anonymous_type, key_data_type, value_data_type)
VALUES('d1', 'd2', 'an illustrative example', 'struct', false, false, false, false, null, null
);
```

The fields of d1 can be inserted into the fields table after the anonymous types are created. Field alpha is an integer with constraints on the values it can take. It can be created as follows:

```
INSERT INTO Data_types(name, derived_from, description, data_type_class,
is_symbol_type, is_concrete_type, is_carrier_type, is_anonymous_type, key_data type,
value_data_type)
    VALUES('anon_d1_alpha', integer, null, 'basic', true, false, false, true, null, null);
    INSERT INTO Data_type_constraint (type_name, id, description, predicate_type, literal)
    VALUES('anon_d1_alpha', 0, null, 'enumeration', null)
    INSERT INTO Enumerated_literal_data_type(type_name, constraint_id, literal,
description)
VALUES ('anon_d1_alpha', 0, '4', null),
    ('anon_d1_alpha', 0, '5', null),
    ('anon_d1_alpha', 0, '45', null);
```

For this data type ingest, the Tosca carrier integer type is mapped to the symbol integer type. So the anonymous type is also a symbol type, but which has additional constraints. Field beta is a container type, and is added using:

INSERT INTO Data_types(name, derived_from, description, data_type_class, is_symbol_type, is_concrete_type, is_carrier_type, is_anonymous_type, key_data_type, value_data_type)
VALUES('anon_d1_beta', null, null, 'list', false, false, false, false, string, null);

The fields of d1 are inserted using:

INSERT INTO Fields(name, field_of, description, type name, default_value, required)
VALUES ('alpha', 'd1', null, 'anon_d1_alpha', null, null),
('beta', 'd1', null, 'anon_d1_beta', null, null),
('gamma', 'd1', null, 'float', null, null);

Reconstructing the data type into a particular representation language depends on the specifics of the language. To render d1 back into Tosca, the d1 record is fetched from Data_types; the derived_from and description fields are created; and then the code path corresponding to a data_type_class of 'struct' is executed. This involves fetching all Fields record where and filling out the name, description, required, default, and type fields. Since types of alpha and beta are anonymous (have is_anonymous=true), the description of the corresponding anonymous types replaces the reference to the anonymous types. The three fields are then made children of the "properties" of d1.

Next, consider an example where a constraint is added to a field of the parent class:

--- data_types:
  d0:
    derived_from: d1
    description: example of constrained fields
    constraints:
      gamma:
        Max_exclusive: 100.0

---

Value constraints do not apply struct data types, so a new anonymous data type must be created:

INSERT INTO Data_types(name, derived_from, description, data_type_class, is_symbol_type, is_concrete_type, is_carrier_type, is_anonymous_type, key_data_type, value_data_type)
VALUES('anon_d0_gamma', float, null, 'basic', true, false, false, true, null, null);

INSERT INTO Data_type_constraint(type_name, id, description, predicate_type, literal)
VALUES('anon_d0_gamma', 0, null, 'Max exclusive', '100.0')

Now d0 and its field can be inserted:

INSERT INTO Data_types(name, derived_from, description, data_type_class, is_symbol_type, is_concrete_type, is_carrier_type, is_anonymous_type, key_data_type, value_data_type)
VALUES('d0', 'd1', 'example of constrained fields', 'struct', false, false, false, false, null, null);

INSERT INTO Fields(name, field_of, description, type_name, default_value, required)
VALUES ('gamma', 'd0', null, anon_d0_gamma, null, null);

The data type of d0.gamma is a derived_from descendent of the data type of d1.gamma, so the rules of overriding parent fields are not violated.

In addition to the tables which define data types, fields, and their constraints, additional tables can store relationships between data types (e.g., relationship tables 750). Examples include carrier_type_of, rep_by, and concrete_type_of. A basic representation of these tables (excluding metadata such as timestamps, identity of the record author, and so on) is just the source and target data type names. For example:

```
CREATE TABLE concrete_type_of (
    symbol_type text NOT NULL,
    replacement_type text NOT NULL,
    description text,
    CONSTRAINT pk_concrete_type_of PRIMARY KEY(symbol_type,
constraint_id, replacement_type),
    FOREIGN KEY (symbol_type) REFERENCES Data_types(name) ON DELETE CASCADE,
    FOREIGN KEY (replacement_type) REFERENCES Data_types (name) ON DELETE CASCADE
);
```

The tables in data model database 700 which describe data types have a great deal of referential integrity, as indicated by the FOREIGN KEY SQL DDL constraints. Every enumerated_literal must be associated with a constraint, every constraint must be associated with a data type, and every field must be associated with a data type.

In addition, data types have references to each other. These references can be direct (derived_from, key_data_type, value_data_type) or indirect (type_name in a Fields record that joins to the data type record). These references ensure data integrity.

In the following portion of the disclosure, discussing deletion safety and other aspects the following notations are used:

Data type: lowercase italic, e.g. d.
Collection of data types: uppercase bracket, e.g. [D].
Uppercase italic: dependency tree, e.g. D.
Data type name: lowercase plain, e.g. d.
Collection of data type names: uppercase plain, e.g. D.

The complex dependency chains can make the process of deleting a data type from the database complicated. A collection of data types [D] is delete safe if every data type that references a data type in [D] is also in [D]. Deletion-safety can be determined by finding all data types that refer to a data type in [D] (via derived_from, key_data_type, value_data_type, or via a field) and verifying that this set is a subset of [D].

Given data type d, its safe-deletion set, safe-deletion(d) is the minimal set of data types [D] that contains d, and which is deletion safe. Potentially, this is the entire database. This set can be found by starting at d and following dependency links until no new data types are reached. While those of ordinary skill in the art will appreciate more than one way to code an appropriate algorithm, one example provides:

```
Given d,
Set [D] = emptyset;
Set [Dnew] = {d};
While [Dnew] is not empty:
    Find all d' such that d'.derived_from is in [Dnew] and d' not in [D], putting these
d' into [Ddrv];
    Find all d' such that d' is a struct and d' has at least one field f whose type is in
[Dnew], and d' is not in [D] putting these d' in [Dfld];
    Find all d' such that d' is a list, set, bag, or map, and d'.key_data_type is in
[Dnew] and d' is not in [D], putting these d' in [Dkey];
    Find all d' such that d' is a map, and d'.val_data_type is in [Dnew] and d' is not
in [D]. Put these d' in [Dval].
    Set [D] = [D] union [Dnew]; and
    Set [Dnew] = [Ddrv] union [Dfld] union [Dkey] union [Dval].
```

This algorithm can be implemented in many ways and in many languages and making greater or lesser use of SQL.

For an example, consider computing safe-deletion(d1) in an example tree in which d0 is derived_from d1; d1 is derived_from d2, a field type of d3, and a key type of d5; d2 is derived_from d6; and d3 is derived_from d4. In the first iteration, d3, d2, and d1 are put into [Dnew] because d3 has a field of type d1, d2 derived_from d1, and d5 is a list of type d1. In the next round, d4 and d6 are put into [Dnew] because they depend_on data types in [Dnew]. At this point the iteration stops. Type d0 is not in safe_deletion(d1) because it does not depend on d1, either directly or transitively.

In normal usage, data types are deprecated rather than deleted, as is discussed herein.

In many cases, all chains of data type dependencies for a Directed Acyclic Graph. For many of the dependencies, basic constraints ensure the acyclicity of the dependence chains. All derived_from dependency chains must be acyclic. This property can be ensured if data types are entered one at a time as the referenced data type must already exist. Dependencies via container types and derived_from dependency chains must be acyclic. A container type cannot contain itself, e.g., type A cannot be defined as list<A>, and this constraint is checked locally. A subtype of an existing data type must have the same essential properties as the parent, so if a subtype is a container, its parent must also be a container. A subtype of a container type can contain a subtype of the type contained by the parent, but subtyped container types cannot induce cyclic dependencies as (working backwards) there must be some parent that contains itself.

Many schema languages, e.g. XSD and Json Schema, have explicit capabilities for cyclic dependencies. These dependencies come from non-basic struct data types (data types that have fields). Data types that contain cyclic dependencies create complications for many utilities and processes, including deletion and hierarchical display of nested data type structure. Furthermore, it is possible to define data types whose constraints require that any valid instantiation have infinite nesting, and this possibility must be excluded.

To check for cyclic dependencies, a dependency tree can be built, which shows data type dependencies through composition. To help in the uniform construction of the dependency tree, container data types can be treated as having fields. List, set, bag, and map containers all have a field with a special name, e.g. $key$, whose type is indicated by the key_data_type field of the data_type record. In addition, map data types have a field with a special name, e.g. $value$, whose type is indicated by the value_data_type field of the data_type record.

For the initial description of the dependency tree, it can be assumed that there is no derived_from relationships in any of the types in the dependency tree. In this case, the dependency tree of data type d, dep_tree(d) or D, is built recursively according to the following rules:

A node in the dependency tree is constructed from a data type by listing the following information:
    The name of the data type;
    Whether or not the data type is a container type;
    The value of the minlength constraint;
        Which is set to 1 for non-container (struct, basic) types; and
        Which otherwise has the default value 0 if no minlength constraint is present.
    For each field:
        The name of the field;
        The name of the field data type;
        Whether the field is required (in the fields record); and
        $key$ and $value$ are always required.
    A pointer (perhaps null) to another dependency tree node.
    The root n of the dependency tree is constructed from d.
    A field entry of a data type node n', with data type d' is expanded by constructing a dependency tree node from d', and pointing to the newly constructed dependency tree node, as long as the following two conditions hold:
        The data_type_class of d' is not basic; and
        d' is not d, and does not appear in the path from n to n'.
    The construction of the dependency tree is completed when no field entry in any node of the tree can be expanded. The dependency tree of d can be computed by various recursive tree construction techniques.

For an example of a dependency tree, the example data type d1 can be used. A dependency tree of d1 can include the following details:

Type name d1 is not a container and has a minimum length of 1, and is defined by fields alpha (anon_d1_alpha) which is required, beta (anon_d1_beta) which is required, and gamma (float) which is required;

Type anon_d1_beta depends from d1 and is a container with a minimum length of 0, and is defined by $key$ (string) which is required.

Data type d1 is a struct, so it is not a container and has min length of 1. Type d1 has three fields, alpha, beta, and gamma. Fields alpha and beta have anonymous types, anon_d1_alpha and anon_d2_beta, respectively. Types anon_d1_alpha and float are basic and therefore are not expanded. Type anon_d1_beta is composite, so a node corresponding to anon_d1_beta is created and linked to field beta. Type anon_d1_beta is a container, with min_length 0.

A list container has a field, $key$ and since field beta is a list of strings, the data type of $key$ is string, which is basic so no more expansions are performed.

A completed dependency tree will have leaves that are either basic types, or are non-basic types but have a repeat occurrence on the root-to-leaf path. Therefore a data type is recursive if at least one of its leaves is not basic, and (else) the data type is non-recursive.

A data type d is recursive because it is or it depends on some data type d' that transitively references itself. These data types d' are the core of the recursive data types, so it can be useful to explicitly name them. A data type d is root-recursive if one of the leaves has data type d. Recursive data types are common in tree-structured languages such as XSD or JSON Schema. Consider an example of a recursive data type using a skeletonized representation of the data types that lists only fields and their types for brevity:

d0:
  alpha: d1
  beta: string
d1:
  gamma: d2
  delta: integer
d2:
  epsilon: d3
  zeta: float
d3:
  $key$: d1

Data type d1 occurs twice in the path from d0 through d3, inclusive. Therefore d0 is recursive, and d1 is root-recursive.

An alternative way to represent and analyze dependencies is to build a dependency graph instead of a dependency tree. The difference is that every data type in the database is a node and every field of a non-basic type is linked to its dependent data type. The root-recursive data types are the nodes in a cycle, and the recursive data types are the nodes that are connected, directly or transitively, to a root-recursive node. Various algorithms can be used for finding all cycles in a graph, and all nodes that lead to a cycle. While dependency trees are discussed more frequently in this disclosure, it is understood that a dependency graph can be used to speed up the detection of possible problematic data types.

If the data types in the dependency tree have derived_from relationships, then the conditions for expansion and the definitions of recursive and root-recursive data types remain the same. The reasons can be divided into two cases. First: There is a path from d' to d" in the dependency tree and d" is transitively derived_from d'. Then since d" contains all fields of d', including the field that leads from d' to d", there is a cycle in the dependencies in the data types. But in this cycle will be found in a path from d" to d" in the dependency tree. Type d' will be found to be recursive (and perhaps root-recursive via a different path) and d" will be found to be root-recursive. Second: There is a path from d' to d" in the dependency tree and d' is transitively derived_from d". There is a cycle in the dependencies if the field of d' exists in d". But in this case there will be a continuation of the path to another d" and the cycle will be found, and d" will be found to be root-recursive.

If a collection of data types is recursive, then by definition there exists at least one cycle among the dependency trees, and therefore there is at least one root-recursive data type. It is possible for such a collection of data types to have constraints such that any instance satisfying the constraints of the data type(s) in the cycle must be infinitely large.

A node in the dependency tree is optional if:
Its parent field entry (if any) has required=False.
It is a container type with a constraint min_length=0.
A root-recursive data type d is root-recursion valid if every path in the dependency tree of d to a leaf with typed has at least one optional data type; otherwise it is root-recursion invalid. A collection of data types [D] is root-recursion valid if every root-recursive data type is root-recursion valid. A data type d' is recursion invalid if there is a root-recursion invalid data type in its dependency tree, else it is recursion valid.

A collection of data types that is recursion-valid has finite-sized instances that satisfy the constraints, if there are any instances that satisfy the constraints (the constraints might be unsatisfiable). Various algorithms can verify whether or not a root-recursive data type is recursion-valid is a tree search algorithm.

For an example of a data type which is not root recursive, running example can be shown augmented with required values in the fields and min length values for the container types. D1 is root-recursive, providing a starting point. The path that leads to d1 again goes through field d1.gamma, which is required, then through d2.epsilon, which is also required. Type d3 is a container type of d1, and its min length is 2. Therefore any data instance satisfying these constraints must be infinitely large. Therefore d1 is root-recursion invalid (and so are d2 and d3). Type d1 is in the dependency tree of d0, so d0 is recursion-invalid.

Data model database 700 supports extensive versioning. The interconnected nature of data types makes changes in-place dangerous, as a change to data type d can cause a change to seemingly unrelated data type e that depends on d because, e.g., either e is transitively derived-from d, or d is in the dependency tree of e.

Referential integrity requires that if a data type d is deleted, all data types e that depend on d must also be deleted. This can be a very large set of data types that would need to be deleted, and many of them might be in active use.

In normal usage, data types are "write-once," e.g., never modified or deleted. Rather than being modified or deleted, data types are versioned, and old versions can be deprecated.

The version of a data type is based on an ordered numbering system. One option for a version number is to use an integer, starting with 1. However, many software developers use semantic versioning, which consists of three integers usually written as major.minor.patch, e.g., version 1.1.2. Ordering is performed lexicographically, starting with major, breaking ties with minor, and breaking ties again with patch. Semantic version numbers often start as 0.1.0.

With versioning, the unique identifier of a data type is no longer its name, but rather a combination of (name, version). Furthermore, all references to a data type either from the data_type table or from the subsidiary fields or data_type_constraint tables must be the pair (name, version). For database efficiency, and to simplify queries, a common best practice is to use an integer field (say, id) as the primary key of the table (e.g., using the serial data type in Postgres), and declaring a UNIQUE constraint on the pair (name, version). Then all REFERENCES constraints are to the id field in the data_type table.

Given a data type name d, the collection of all data_type records in the database with name=d are the versions of d. The version of d with the largest version is the current version of d, and the other versions of d are previous versions of d.

The definition of the dependency tree must be modified slightly to account for versions. Each data type name is now a pair (name, version). The expansion rule now requires a match on both name and version to stop the expansion of a data type node. While a data type named might appear multiple times in a root-to-leaf path, if there are cyclic dependencies then eventually there will be a cycle with a particular version of d.

In the presence of versioned data types, version management becomes an important issue. Because of the interconnected nature of data types, a version change in one data type can affect the versioning properties of many other data types. Let d be a data type, let D be its dependency tree, and let D be the set of data type names in D.

A data type d is up-to-date if d is current, and for each d' in D, d' is current. Otherwise, d is obsolete. A data type d can be determined to be up-to-date or obsolete by constructing its dependency tree and for every node, checking if the data type is up-to-date.

A data type d with name d and version v can be marked as deprecated, meaning that it should not be in active use. If d is deprecated, then every data type d' with name d and version v'<=v is also deprecated. The collection of data types that are deprecated can be summarized with a table that maps data type named to the largest version v that is deprecated, if any.

A data type d is transitively deprecated if d is deprecated, or if there is a d' in D such that d' is deprecated. A data type dean be determined to be transitively deprecated by building its dependency tree and checking each node to determine if the data type represented by the node is deprecated.

A data type d is version-consistent if for each data type name d' in D, every node d' in D that represents a data type with name d' has the same version. Otherwise, d is version-inconsistent.

The algorithms for computing if a data type d is up-to-date, transitively deprecated, or version consistent consist of building the dependency tree D of d and performing a search on D for the indicated properties. Various algorithms can be employed to search the dependency tree.

For an example of these concepts, consider the simplified dependency tree with eight nodes; (d1, version 1); (d2, version 2), (d3, version 5), and (d4, version 2), which depend from (d1, version 1); (d5, version 3) and (d6, version 2), which depend from (d2, version 2); and (d3, version 1) and (d5, version 3), which depend from (d4, version 2). For the purpose of the discussion, all nodes in the tree are up-to-date except for (d3, version 1). Then, (d1, version 1) is obsolete because (d3, version 1) is not current. Type (d1, version 1) is transitively deprecated because (d3, version 1) is deprecated. Finally, (d1, version 1) is version-inconsistent because it depends on two different versions of d3.

A data type d that is obsolete can, in principal, be made up-to-date by replacing each reference to an obsolete data type with the current data type. However, the nested and possible cyclic nature of data type cross-references adds some complications to this process.

An algorithm for computing an up-to-date version of a data type d, where d is current, is as follows. Let D be the dependency tree of d:

1. Do
   a. Build the dependence tree $D$ of $d$;
   b. Make a search of $D$ starting at $d$, processing parents before children;
   c. At each node $d'$ with parent $p$ in the search
      i. if $d'$ is not current,
         1. let $d''$ be the current version of $d'$
         2. for each node $n$ on the path from $d'$ to $d$,
            a. create a new current node $n'$ if one has not already been created
            b. replace the reference to $n$ with $n'$ in $p'$, the parent of $n$.
         3. replace the reference to $d'$ with a reference to $d''$ in $p$.
2. until $D$ does not change.

Such an algorithm may replace references to obsolete data types with current data types. However doing so requires a change to the parent. Replacing the reference to d' to d'' in the parent p changes p. If p is not a newly created version, a new version of p must be created and made the current version. This rule applies recursively up to the root d.

When the algorithm replaces a previous node with a current node, it does not recompute the dependency subtree rooted at the replacement node. If the replacement node is current but not up-to-date, then an up-to-date version of the replacement node must be created. This is handled by repeating the transformation of D until there is no further change. An alternative algorithm will build the dependence subtree of the replacement node and continuing the search for previous nodes in the subtree. Alternative algorithms can be used in various embodiments.

Consider an example of computing an up-to-date version of d1 in which the tree contains (d1, version 2); (d2, version 2), (d3, version 5), and (d4, version 3) which depend from (d1, version 2); (d5, version 3) and (d6, version 2) which depend from (d2, version 2); and (d3, version 1) and (d5, version 3) which depend from (d4, version 4). While performing the search of the dependence tree of (d1, version 1), node (d3, version 1) is found to be out-of-date. Therefore, all ancestors of (d3, version 1) must be replaced with a new version, as described in comparison to the earlier tree version described above. Finally, in an additional update from that described above, (d3, version 1) is replaced by (d3, version 5), making (d1, version 2) up-to-date, as well as version consistent and no longer transitively deprecated.

If (d3, version 5) were not basic, another pass of building the dependence tree and replacing previous data types would be required.

This creation of an up-to-date version of d can involve unintended changes to d, and to other parts of the database. Therefore the result should be subject to a review and not automatically installed into the database.

Data model database 700 also provides namespaces for different groups. In a large organization, there can be many groups developing data types, and many levels of "official" data types. Different groups may independently use the same name for different data types. Therefore it is convenient to have different groups work in different namespaces.

To accommodate namespaces, the data type name can be replaced with the pair (namespace, type_name). When combined with versioning, the primary key of a data type is (namespace, type_name, version). Therefore, foreign key references are triples (namespace, type_name, version). For database efficiency, and to simplify queries, a common best practice is to use an integer field (say, id) as the primary key of the table (e.g., using the serial data type in Postgres), and declaring a UNIQUE constraint on the pair (name, version). Then all REFERENCES constraints are to the id field in the data_type table.

Issues may arise when transferring data types between namespaces. For example, a data type in one namespace can reference a data type in another. Other issues can arise when making a bulk transfer from namespace NS1 to namespace NS2, which involves collection of the dependency tree, collection of distinct types (including multiple versions of the same type), forming a replacement list of types in NS2 to replace types from NS1, moving all unreplaced types from NS1 to NS2, making appropriate changes in type references and naming, and create linkages for moved types in a "created from" table.

Other kinds of transformations make use of the dependency tree. For example, a symbol data type can be transformed to a pure concrete data type. The concrete_type_of relationship provides substitutions of (more) concrete data types for symbol basic data types. Various algorithms can be used for computing the set of complete acyclic expansions of a symbol concrete data type. For basic symbol data type d, each child of din acyclic_expansion(d) is a valid substitution for d, and each child that is not marked incomplete produces a pure concrete substitution of d.

For a given symbol data type, replacements can be found. Let dep_tree(d) be the dependency tree of d. The algorithm for transforming d from symbol to pure concrete is:

---

1. Make $dc$ a copy of $d$ but with a changed name.
2. Compute dep_tree($dc$).
3. Let $Ddep$ be the set of basic symbol types in the dependency tree of $dc$ (found at the leaves of dep_tree($dc$)).
4. While $Ddep$ is not empty:
   a. Find $Rdep$, which maps elements of $Ddep$ to a replacement dependency subtree that is pure concrete (alternatively, incomplete substitutions can be made). $Rdep$ is found by:
      i. For every $d'$ in $Ddep$,
         1. Choose a child $d$ of $d'$ in acyclic_expansion($d'$) that is not marked incomplete and put $(d', d)$ in $Rdep$.
         2. Alternatively, $d$ can be marked incomplete.
   b. compute an updated version of $dc$ as follows:
      i. For every leaf $I$ in dep_tree($dc$) such that $I$ is basic symbol,
         1. For each node $n$ on the root-to-leaf path from $dc$ to $I$,
            a. If n was not changed from dep_tree($dc$),
               i. Create a new node $n'$ which is equal to $n$ but with a new name.
               ii. Replace the reference to $n$ with a reference to $n'$ in $p'$, the parent of $n$.
         2. Replace $I$ with Rdep($I$) in $p$, the parent of $I$.
   c. Recompute $Ddep$ = dep_tree($dc$).

---

The process of the replacement of basic symbol data types with concrete replacements is similar to the process of the replacement of obsolete data types with up-to-date data types as described herein. This algorithm is one example that replaces basic symbol data types at the leaves of a dependency tree, but others can be used without departing from the scope or spirit of the innovation. The replacement data types might directly or transitively depend on other symbol basic data types. Therefore iteration is required until all symbol basic data types have been replaced. An alternative algorithm transforms the replacement dependency trees before performing the replacement. A recursive algorithm might be more efficient in certain embodiments.

Aspects herein also support transformation of a pure concrete carrier type to a pure carrier data type. For a data type to be deployed into a target schema system, it must be transformed into a pure carrier type. The above algorithm(s) provide for transforming a symbol type into a pure concrete type. Therefore, the input to the transformation algorithm can be a pure concrete type.

The algorithm substitutes carrier types for concrete types using the carrier_type_of relation. Aspects herein describe the carrier_type_of relation and how it can be extended using inference rules and the rep_by relation. Let CTOx be the carrier_type_of relation which is fully extended by the rep_by and carrier_type_of inference rules described herein. The algorithms for performing this inference are well known to experts in the field. If T is the target schema system, let CTOx(T) be CTOx restricted to target T.

Let dep_tree(d) be the dependency tree of d. An algorithm for transforming d from pure concrete to pure carrier can be described as follows:

---

1. Make $dc$ a copy of $d$ but with a changed name;
2. Compute dep_tree($dc$);
3. Let $Dconc$ be the set of basic concrete types in the dependency tree of $dc$ (found at the leaves of dep_tree($dc$));
4. For each $dc$ in $Dconc$, choose a carrier type e such that $(dc, c)$ is in CTOx(T), denoting this choice by Carrier($dc$);
   a. If there is a $dc'$ in $Dconc$ such that there is no matching record in CTOx(T), then the transformation fails;
5. Compute an updated version of $dc$ as follows:
   a. For every leaf $I$ in dep_tree($dc$) such that $I$ is basic concrete,
      i. For each node n on the root-to-leaf path from $dc$ to $I$,
         1. If $n$ was not changed from dep_tree($dc$),
            a. Create a new node $n'$ which is equal to $n$ but with a new name.
            b. Replace the reference to n with a reference to $n'$ in $p'$ (the parent of $n$).
      ii. Replace $I$ with Carrier($I$) in $p$ (the parent of I).

The algorithm to change a pure concrete type into a pure carrier_type is not recursive because basic types get replaced by other basic types.

The algorithm can fail to find a pure carrier_type if there is a concrete type with no carrier_type_of_mapping, even with transitive closure of the inference rules. For example a symbol type ip_address might be made concrete by replacing it with type Cidr (as described herein). To translate this type into JSON, a JSON carrier_type is needed for Cidr. However, if there is no native Cidr type in JSON, then a conversion to JSON carrier types will fail.

There are several directions of recourse if the conversion from a pure concrete to a pure carrier_type fails. The target schema can be searched for an appropriate mapping if the e concrete_type_of relationship is incomplete. The rep by rules can be augmented to enable an appropriate mapping to be discovered in CTOx(JSON). If the pure concrete type was created from n symbol type that contained ip_address, the symbol to pure concrete type conversion can be revisited and use only symbol-to-concrete mappings such that the concrete types have a mapping to a carrier type in T.

The algorithm symbol to pure concrete conversion algorithm can be augmented to find pure concrete types that have mappings to T as follows:

When computing acyclic_expansion(d), find the invalid substitutions by:
  marking leaves which represent concrete types as invalid if the concrete type has no mapping in CTOx(T).
  marking the interior nodes as invalid using the same algorithm used to mark nodes as incomplete as described above.

In step 4.a.i.1 of the algorithm for transforming a symbol type to a pure concrete type, it may also be required that the replacement d is not marked invalid.

Figure 8:
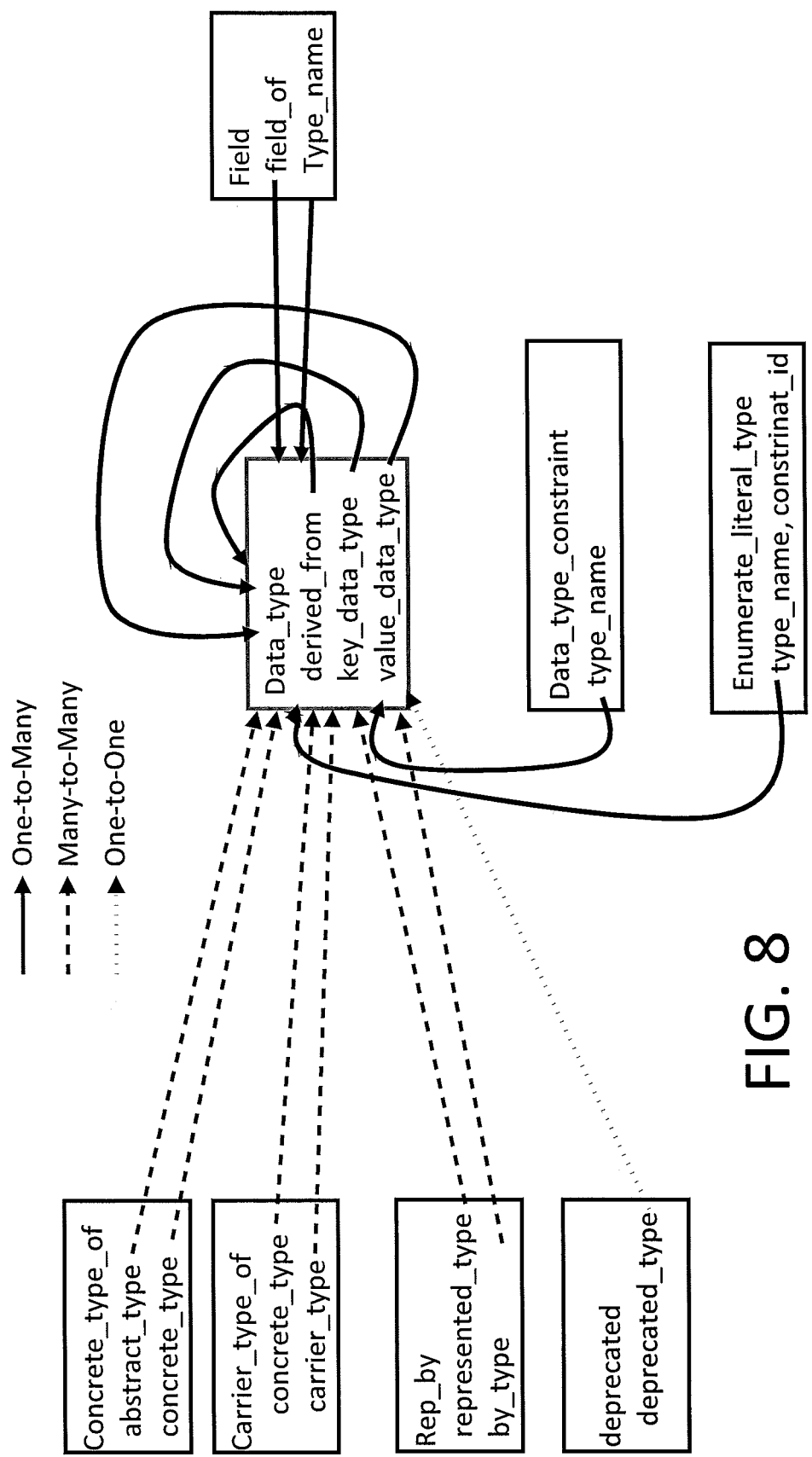
FIG. 8 is an example entity relationship diagram for a data model database disclosed herein.

FIG. 8 provides further details on a data model database, illustrating an example entity relationship diagram 800 for a data model database disclosed herein. Entity relationship diagram 800 uses distinct lines to indicate one-to-one, one-to-many, and many-to-many relationships with respect to data types, constraints, fields, relationships, et cetera.

Figure 9:
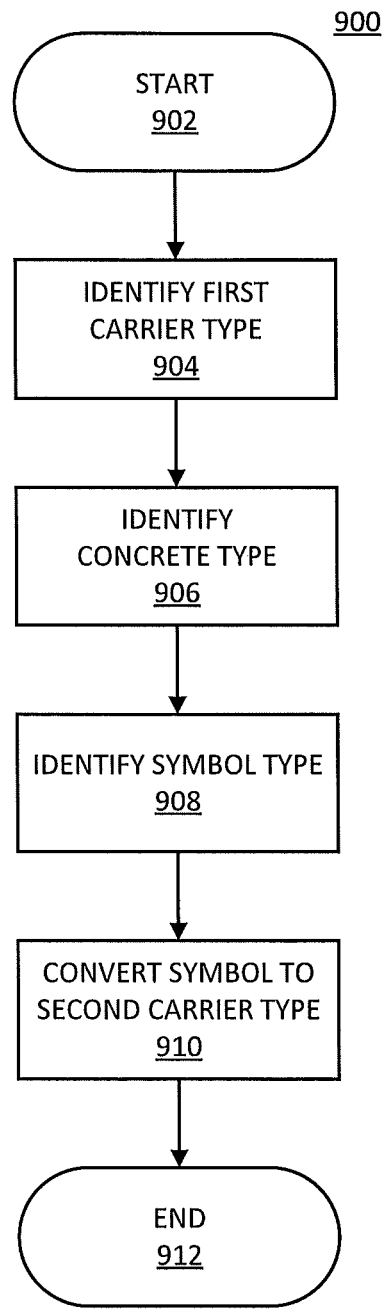
FIG. 9 is a flowchart of an example methodology using a data model database disclosed herein.

With the above contents and properties of data model database 700 understood, various methodologies can be implemented using data model database 700 or similar databases disclosed herein. FIG. 9 illustrates an example methodology 900 for converting data between types using a data model database disclosed herein. Methodology 900 begins at 902 and proceeds to 904 where aspects are performed including identifying a carrier type based on language-specific carrier data from a first system. Thereafter, at 906, aspects are performed including identifying, in a data model database, a language-agnostic concrete type associated with the language-specific carrier type. At 908, aspects are performed including identifying a symbol data type associated with the language-agnostic concrete type. At 910, aspects are performed including converting the language-specific carrier data to a second language-specific carrier type based on the symbol data type. Thereafter, at 912, methodology 900 ends.

In various embodiments, methodology 900 can further include identifying a second language-agnostic concrete type based on the symbol data type and identifying the second language-specific carrier type based on the second language-agnostic concrete type.

In various embodiments of methodology 900 converting the language-specific carrier data is performed using a mapping table defining a plurality of relationships (e.g., with a rep by relationship). In embodiments, the mapping table includes a first relationship defining that the first language-specific carrier type and the second language-specific carrier type share the language-agnostic concrete type, and wherein the mapping table includes a second relationship defining that every value of the first language-specific carrier type exist among values of the second language-specific carrier type.

In various embodiments of methodology 900, converting the language-specific carrier data is performed using a constraint table. In alternative or complementary embodiments, the language-specific carrier data has an enumerated value.

Figure 10:
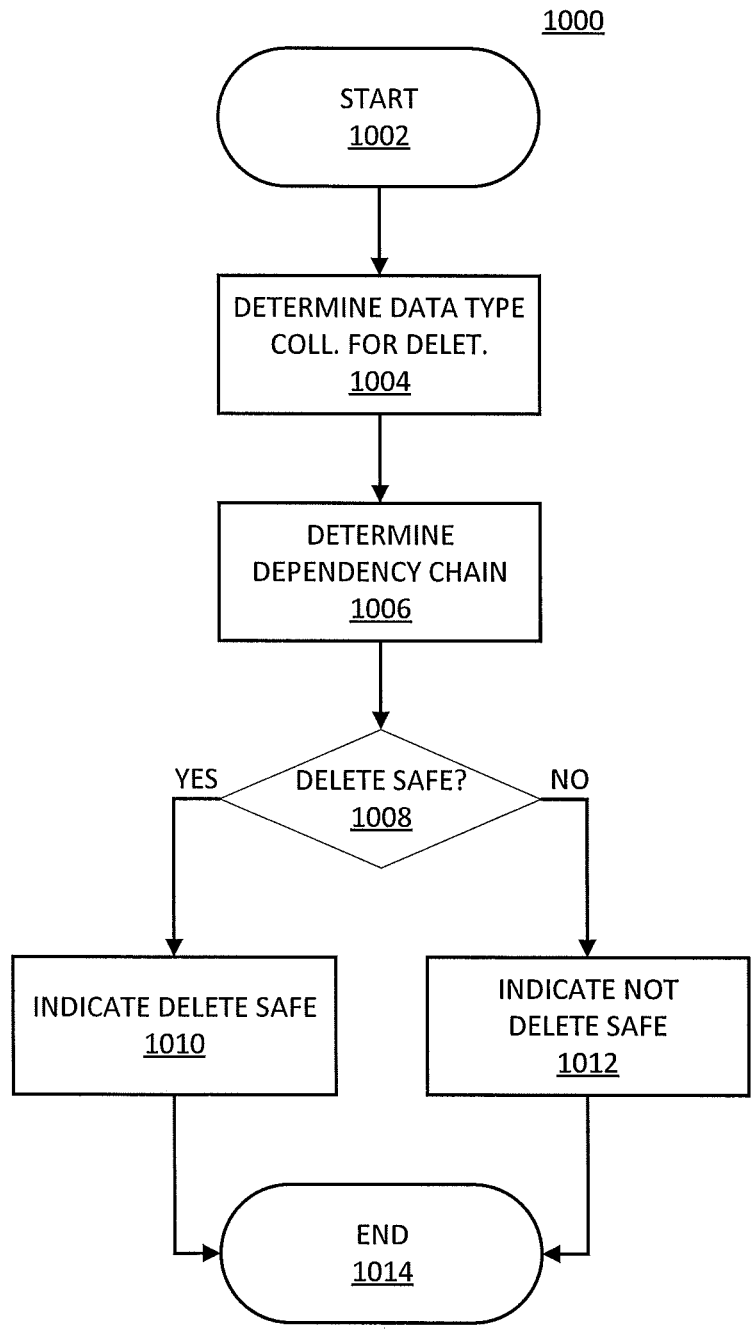
FIG. 10 is a flowchart of another example methodology using a data model database disclosed herein.

FIG. 10 illustrates an example methodology 1000 for determining whether data is delete-safe using a data model database disclosed herein. Methodology 1000 begins at 1002 and proceeds to 1004 where aspects performed include receiving a request to delete a data type collection, wherein the data type collection is reflected in a data model database, and wherein the data type collection includes one or more data types, the one or more data types including at least one of a symbol data type, a language-agnostic concrete type, or a language-specific carrier data type. At 1006, aspects performed include determining a dependency chain for the data type collection using the data model database.

At 1008, a determination is made as to whether the data type collection is delete safe. Aspects performed based on whether the determination at 1008 returns positive or negative include indicating the data type collection as delete safe (1010) or not delete safe (1012), wherein the data type collection is marked as delete safe (1010) if the dependency chain indicates that remaining data types in the data model database do not include references to the one or more data types of the data type collection, and wherein the data type collection is marked not delete safe (1012) if the dependency chain indicates that one or more of the remaining data types in the data model database include references to the one or more data types of the data type collection.

In various embodiments of methodology 1000, the data type collection is a composite data field. In some embodiments, the composite data field is one of a structure or a container.

In various embodiments of methodology 1000, the dependency chain is determined using a mapping table including a plurality of relationships. In embodiments the plurality of relationships can include a symbol relationship property shared by two or more symbol data types, the plurality of relationships includes a concrete relationship property shared between two or more concrete data types, and a carrier relationship property is shared by two or more carrier data types. In embodiments, the plurality of relationships indicate one or more of the remaining data types are derived from the one or more data types, or in alternative embodiments the plurality of relationships indicate no remaining data types are derived from the one or more data types.

Various other methodologies are enabled using the data model database disclosed herein. A methodology disclosed herein performs automatically inferring the carrier types that can represent a concrete type. Another methodology disclosed herein performs expanding a symbol type to a concrete type. Another methodology disclosed herein performs inferring concrete_type_of relationships. Another methodology disclosed herein performs determining whether an expansion of a symbol type is cyclic. Another methodology disclosed herein performs determining whether an expansion of a symbol type is incomplete.

Another methodology disclosed herein performs inferring that two types are similar by replacing concrete types with symbol types. This is achieved by applying the concrete_type_of relationship in reverse and to infer that two different representations of a particular symbol (e.g., a timestamp) both refer to the symbol type (e.g., timestamp).

Another methodology disclosed herein performs determining when it is safe to delete a data type, or when is it safe to update a data type without incrementing its version number.

Another methodology disclosed herein performs detecting when a collection of data types is recursive. This methodology is useful because handle modeling languages, such as XSD or JSON Schema, may include recursion detection algorithms. However, before these can be used, the model must be loaded into memory. Models are described in files and one model can "include" the definitions in another. So it is possible that a modification in one file can create a recursion when included by another file. When all of the model elements are in a database, the detection algorithm can be performed at update time, overcoming the limitations of conventional recursion detection algorithms.

Another methodology disclosed herein performs determining if a data type is version-consistent. Another methodology disclosed herein performs determining if a data type is transitively deprecated. Another methodology disclosed herein performs determining if a data type is up-to-date. Another methodology disclosed herein performs transforming a concrete type into a deployable (carrier) type.

Still further methodologies involve determining if any/all/no expansions of a symbol type via concrete_type_of expansions are cyclic. Another methodology disclosed herein performs determining if any/all/no expansions of a symbol type via concrete_type_of expansions are incomplete.

Another methodology disclosed herein performs determining if two basic types are the same. Two basic types are the same if they use the same or equivalent built-in types (e.g., concrete types not derived from anything that can be mapped by rep by to the same basic type) and they have the same constraints. These can be explicit types or they can be anonymous types (types defined in field definitions). For example, a field can be defined as a string with possible values ('tcp', 'icmp'). By putting all of these constraints in a database it is possible to find these multiple definitions.

Another methodology disclosed herein performs determining if two basic types are similar based on their constraints. For example, one field can be a string with possible values ('tcp', 'udp', 'icmp') and another might be a string with possible values ('tcp', 'udp', 'igmp'). SQL queries can be written which search for types with overlapping enum sets, and a match can be found, indicating that these types refer to related things.

Another methodology disclosed herein performs finding "attributes" (a field name that has a well-established meaning). All of the fields are in a table, along with their data types. A simple query extracts repeated field names with their data types. A field name that often has the same type is a candidate for being declared a field. Fields with the same name but a different type are flagged as problems.

Further methodologies disclosed herein provide searching capability. For example, a search can be conducted for all data types which are relevant to a "DNS_VNF". This search can be restricted to the data type name, data type comment, field name, field comments, constraints, or any combination. These search constraints can be further refined, e.g. to search for multiple keywords used in conjunction. Conventional text search capabilities, e.g. grep, do not provide this searching functionality as 1) the collection of all text files which define the types might not be readily available and 2) regular text search generally returns many false positives.

As described above, the exemplary embodiments can be in the form of processor-implemented processes and devices for practicing those processes, such as a server in a regional network or cloud data center. The exemplary embodiments may be embodied as either centralized hardware and software or distributed hardware and software. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. A method, comprising:

identifying, by a processing system including a processor, a language-specific carrier data type based on language-specific carrier data from a first system, the language-specific carrier data type being one of a plurality of carrier data types;

identifying, by the processing system, in a data model database, a language-agnostic concrete data type associated with the language-specific carrier data type, the language-agnostic concrete data type being one of a plurality of concrete data types;

identifying, by the processing system, a symbol data type associated with the language-agnostic concrete data type, the symbol data type being one of a plurality of symbol data types; and converting, by the processing system, the language-specific carrier data to a second language-specific carrier data type based on the symbol data type, wherein the converting facilitates interoperability of software applications to improve delivery of computing services, wherein the converting is performed using a mapping table defining a plurality of relationships including a symbol relationship property shared by two or more of the plurality of symbol data types, a concrete relationship property shared by two or more of the plurality of concrete data types, and a carrier relationship property shared by two or more of the plurality of carrier data types.

2. The method of claim 1, further comprising:

identifying, by the processing system, a second language-agnostic concrete type based on the symbol data type; and identifying, by the processing system, the second language-specific carrier type based on the second language-agnostic concrete type.

3. The method of claim 1, wherein the data model database comprises one or more composite data types including a container of one or more of the plurality of symbol data types.

4. The method of claim 3, wherein the mapping table includes a first relationship defining that the first language-specific carrier type and the second language-specific carrier type share the language-agnostic concrete type, and wherein the mapping table includes a second relationship defining that every value of the first language-specific carrier type exist among values of the second language-specific carrier type.

5. The method of claim 1, wherein converting the language-specific carrier data is performed using a constraint table.

6. The method of claim 1, wherein the language-specific carrier data has an enumerated value.

\* \* \* \* \*